United States Patent
Umayahara et al.

(10) Patent No.: US 7,608,354 B2
(45) Date of Patent: Oct. 27, 2009

(54) FUEL CELL SYSTEM AND CONTROL METHOD OF SAME

(75) Inventors: Kenji Umayahara, Susono (JP); Shimpei Miura, Rancho Palos Verdes, CA (US); Minobu Mizuno, Toyota (JP); Yasunobu Jufuku, Mishima (JP); Masahiko Hasegawa, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 480 days.

(21) Appl. No.: 10/592,466

(22) PCT Filed: Mar. 15, 2005

(86) PCT No.: PCT/IB2005/000654

§ 371 (c)(1),
(2), (4) Date: Sep. 11, 2006

(87) PCT Pub. No.: WO2005/091397

PCT Pub. Date: Sep. 29, 2005

(65) Prior Publication Data

US 2007/0196709 A1    Aug. 23, 2007

(30) Foreign Application Priority Data

Mar. 16, 2004    (JP) ............... 2004-075040

(51) Int. Cl.
*H01M 8/04*    (2006.01)
(52) U.S. Cl. ............... 429/25; 429/23; 429/22
(58) Field of Classification Search ............... 429/22, 429/25, 13, 23
See application file for complete search history.

(56) References Cited

U.S. PATENT DOCUMENTS

| 7,476,458 B2 * | 1/2009 | Fujita ............... 429/25 |
| 2001/0028970 A1 | 10/2001 | Sano et al. |
| 2002/0022167 A1 | 2/2002 | Herron |
| 2003/0012989 A1 | 1/2003 | Ueda et al. |
| 2003/0190502 A1 | 10/2003 | Illner et al. |

FOREIGN PATENT DOCUMENTS

| EP | 0 973 219 A2 | 1/2000 |
| EP | 1 018 774 A1 | 7/2000 |
| EP | 1 271 681 A2 | 1/2003 |
| FR | 2 841 044 A | 12/2003 |

(Continued)

*Primary Examiner*—Patrick Ryan
*Assistant Examiner*—Thomas H. Parsons
(74) *Attorney, Agent, or Firm*—Oliff & Berridge, PLC

(57) ABSTRACT

A gas/liquid separation device is connected to a discharge valve which can discharge fuel gas to the outside of a fuel cell system along with water accumulated in the gas/liquid separation device. A change in pressure at a portion upstream of the discharge valve, which occurs due to an opening operation of the discharge valve, is detected or estimated, and an integral value is obtained by integrating the amount of change in the pressure with respect to time from when the discharge valve is opened or a parameter value corresponding to the integral value is obtained. The integral value represents an amount of fuel gas discharged due to the opening operation of the discharge valve. It is therefore possible to reliably discharge a desired amount of fuel gas by deciding a closing time at which the discharge valve is closed based on the integral value or the parameter value.

19 Claims, 14 Drawing Sheets

FOREIGN PATENT DOCUMENTS

| | | |
|---|---|---|
| JP | A-02-176440 | 7/1990 |
| JP | A-06-176783 | 6/1994 |
| JP | A-2002-216812 | 8/2002 |
| JP | A-2002-289237 | 10/2002 |
| JP | A-2002-313390 A | 10/2002 |
| JP | A-2002-313403 | 10/2002 |

* cited by examiner

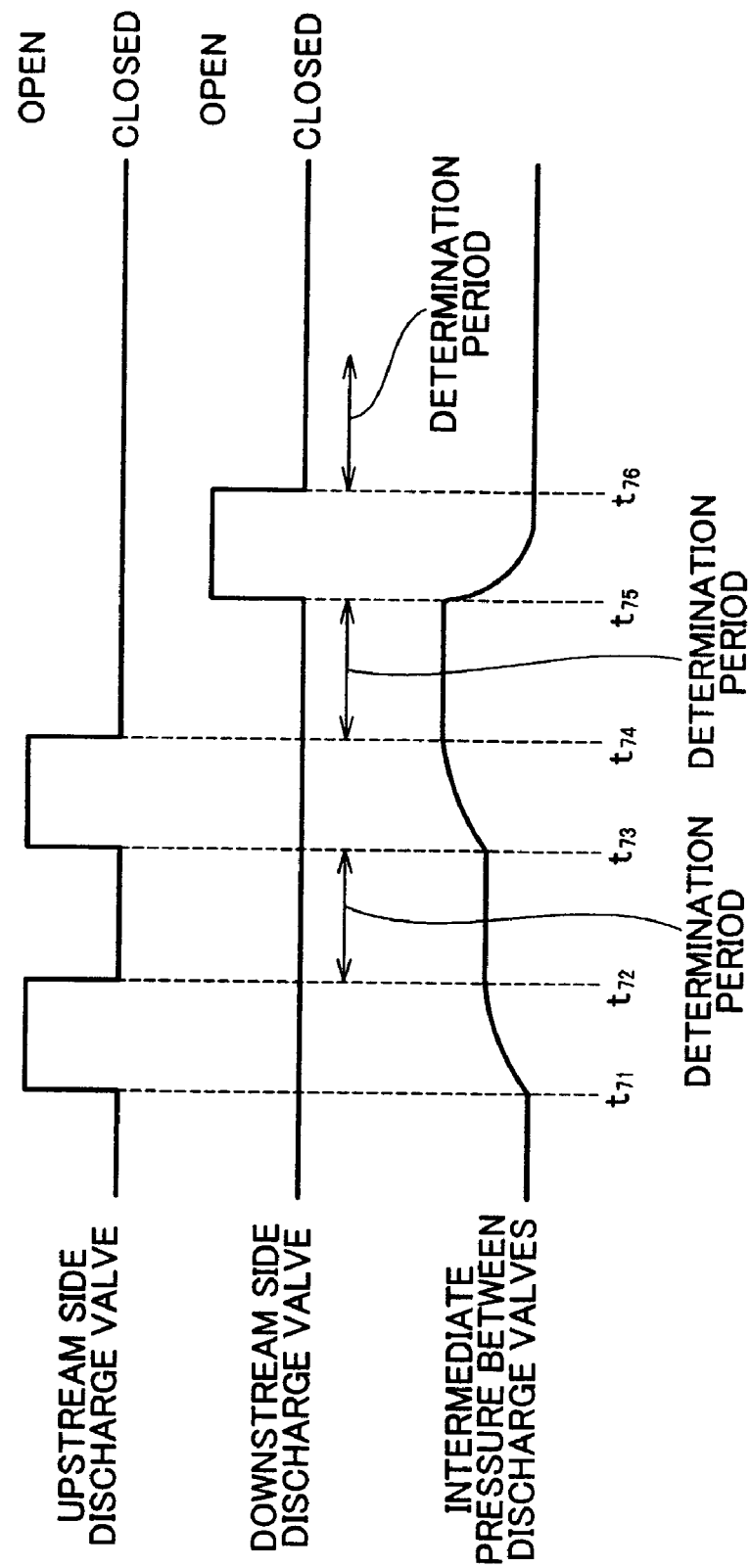

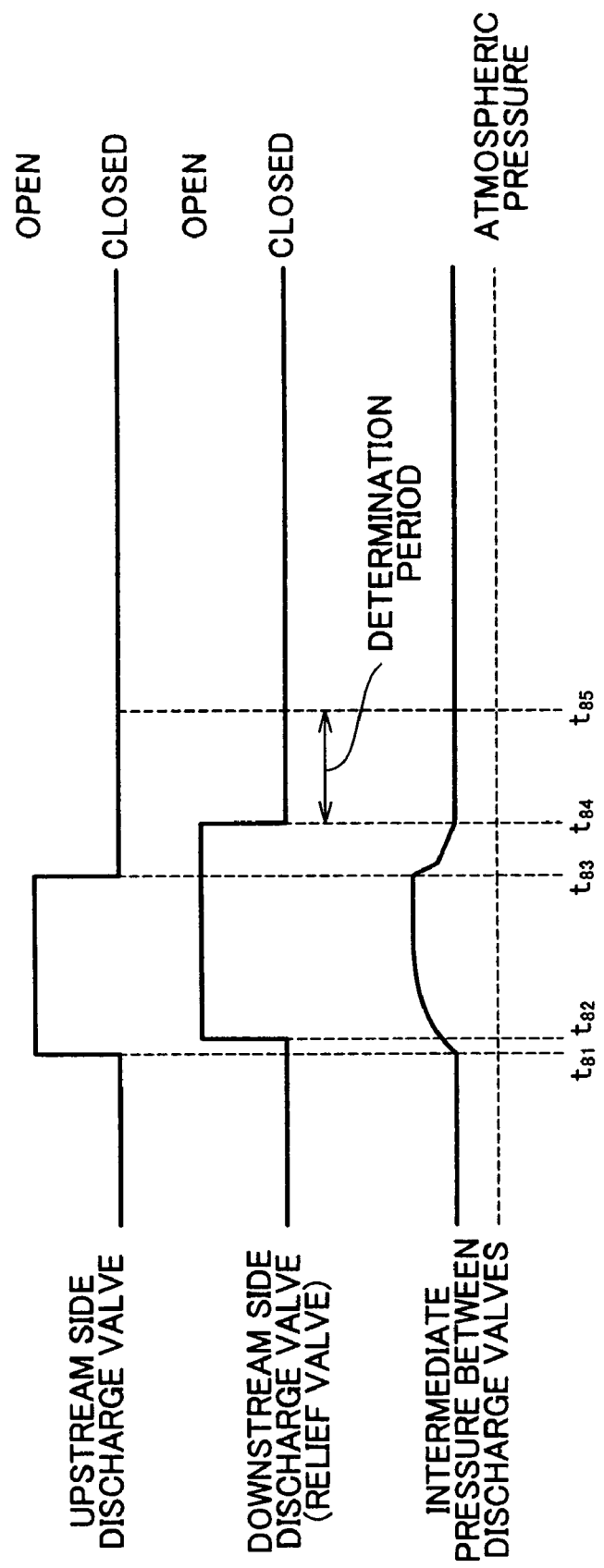

FUEL CELL SYSTEM AND CONTROL METHOD OF SAME

FIELD OF THE INVENTION

The invention relates to a fuel cell system which is configured such that both accumulated water and fuel gas can be discharged from a discharge valve of a gas/liquid separation device provided in an off-gas passage, and a control method of the same. More particularly, the invention relates to a technology of controlling an amount of fuel gas discharged to the outside of a fuel cell system through a discharge valve.

BACKGROUND OF THE INVENTION

A fuel cell has a structure in which an electrolyte membrane such as a polymer electrolyte membrane is interposed between an anode and a cathode. In the fuel cell, when fuel gas containing hydrogen contacts the anode and oxidizing gas containing oxygen such as air contacts the cathode, an electrochemical reaction occurs at each of both electrodes, whereby an electromotive force is generated. In a fuel cell system in which electric power is obtained by such a fuel cell, it is important to minimize unnecessary consumption of hydrogen used as fuel, in terms of energy saving. Accordingly, in a conventional fuel cell system, off-gas of the fuel gas used in the fuel cell is re-circulated in the fuel cell, whereby efficient use of the hydrogen remaining in the off-gas is promoted.

In the fuel cell, water is generated by an electrochemical reaction at the cathode, that is, a reaction of hydrogen ions which have permeated through the electrolyte membrane from the anode side and oxygen contained in the oxidizing gas. Although a major portion of the water generated by the reaction is contained in the off-gas of the oxidizing gas and then released into the atmosphere, part of the generated water permeates through the electrolyte membrane and moves to the anode side. Although the generated water moved to the anode side is contained in the off-gas of the fuel gas and then discharged from the fuel cell, the off-gas is re-circulated in the fuel cell as fuel gas. Accordingly, water is accumulated in a fuel gas circulation system in which fuel gas is circulated. Accumulation of water in the circulation system inhibits supply of hydrogen to the anode, causing deterioration of power generation performance of the fuel cell.

In order to address this problem, Japanese Patent Application Publication No. JP-A-2002-313403 discloses a technology in which a drain device (a gas/liquid separation device) is provided in a fuel gas passage, and water contained in the fuel gas is collected by the drain device. A valve (discharge valve) is provided in a lower portion of an accumulation portion of the drain device. The water accumulated in the accumulation portion can be discharged to the outside of a fuel cell system by opening the valve. In this technology, a water level of the water accumulated in the accumulation portion is measured by a water level sensor, and the valve is opened/closed based on the measurement value.

As disclosed in each of Japanese Patent Application Publication No. JP-A-2002-216812 and Japanese Patent Application Publication No. JP-A-2002-289237, a system is known in which a purge valve is provided in a fuel gas circulation system, and nitrogen accumulated in the circulation system can be discharged to the outside of the fuel cell system along with fuel gas. Nitrogen is a main component of the oxidizing gas supplied to the cathode. When part of the oxidizing gas permeates through an electrolyte membrane from the cathode side to the anode side, nitrogen is accumulated in the circulation system. An increase in a nitrogen concentration in the fuel gas decreases a hydrogen concentration, and therefore reduces power generation performance of a fuel cell. Accordingly, in the system disclosed in Japanese Patent Application Publication No. JP-A-2002-216812 and the like, the nitrogen is discharged to the outside of the fuel cell system along with the fuel gas by opening the purge valve when a predetermined condition is satisfied.

In a system disclosed in Japanese Patent Application Publication No. JP-A-2002-313403, in terms of maintenance of power generation performance of a fuel cell, it is important to make it possible to discharge nitrogen from a fuel gas circulation system. Therefore, it is preferable to provide a purge valve in the system disclosed in Japanese Patent Application Publication No. JP-A-2002-313403 as well. In this case, it is also desired that the structure of the system be simplified by endowing the valve of the drain device with the function of the purge valve, namely, both the accumulated water and the fuel gas be discharged by using the valve of the drain device.

However, the system disclosed in Japanese Patent Application Publication No. JP-A-2002-313403 has a problem in using the valve of the drain device also as the purge valve. In the system disclosed in Japanese Patent Application Publication No. JP-A-2002-313403, an amount of discharged water can be measured by using the water level sensor. However, when the fuel gas is also discharged, an amount of discharged fuel gas cannot be measured. If the amount of discharged fuel gas cannot be obtained, the hydrogen concentration in the fuel gas may not be recovered sufficiently, or hydrogen may be discharged unnecessarily.

The system disclosed in Japanese Patent Application Publication No. JP-A-2002-313403 has a problem also in discharge of the accumulated water. When the system disclosed in Japanese Patent Application Publication No. JP-A-2002-313403 is an in-vehicle system for an electric vehicle or the like, a fluid level of the water in the accumulation portion changes due to a tilt, vibration and the like of the vehicle. Therefore, a water level cannot be accurately measured by the water level sensor. If a water level cannot be measured accurately, it is difficult to reliably discharge the accumulated water.

DISCLOSURE OF THE INVENTION

It is a first object of the invention to provide a fuel cell system which can reliably discharge a desired amount of fuel gas along with accumulated water by using a discharge valve connected to a gas/liquid separation device, and a control method of the same.

It is a second object of the invention to provide a fuel cell system which can reliably discharge a desired amount of accumulated water by using a discharge valve connected to a gas/liquid separation device, and a control method of the same.

When the first object is integrated with the second object, the invention is made in order to discharge a desired amount unnecessary substance from an off-gas passage for the fuel gas.

A first aspect of the invention relates to a fuel cell system including a fuel cell which generates electric power by being supplied with hydrogen and oxygen; an off-gas passage through which fuel gas discharged from the fuel cell passes; a gas/liquid separation device which is provided in the fuel off-gas passage and which separates water from the fuel gas and accumulates the water; a discharge valve which is connected to the gas/liquid separation device and which can discharge the fuel gas to an outside of the fuel cell system along with the water accumulated in the gas/liquid separation device; and control means for controlling an opening/closing operation of the discharge valve. The control means detects or estimates a change in pressure at a portion upstream of the discharge valve, which occurs due to an opening operation of the discharge valve, and decides a closing time at which the discharge valve is closed (hereinafter, referred to as "a closing time of the discharge valve") based on an integral value obtained by integrating an amount of change in the pressure at the portion upstream of the discharge valve with respect to time from when the discharge valve is opened or a parameter value corresponding to the integral value.

In the fuel cell system according to the first aspect, when the discharge valve is opened by the control means, first, the water accumulated in the gas/liquid separation device is discharged to the outside of the fuel cell system, and fuel gas is then discharged from the off-gas passage. When the fuel gas is discharged from the off-gas passage, the pressure at the portion upstream of the discharge valve (for example, the pressure in the gas/liquid separation device) decreases according to the amount of discharged fuel gas. At this time, the value, which is obtained by integrating the amount of change in the pressure at the portion upstream of the discharge valve with respect to time from when the discharge valve is opened, represents the amount of fuel gas discharged to the outside of the fuel cell system due to an opening operation of the discharge valve. With the fuel cell system, it is possible to reliably discharge the fuel gas by a desired amount by deciding the closing time of the discharge valve based on the integral value or the parameter value corresponding to the integral value.

A second aspect of the invention relates to a fuel cell system including a fuel cell which generates electric power by being supplied with hydrogen and oxygen; an off-gas passage through which fuel gas discharged from the fuel cell passes; a gas/liquid separation device which is provided in the fuel off-gas passage and which separates water from the fuel gas and accumulates the water; a discharge valve which is connected to the gas/liquid separation device and which can discharge the fuel gas to an outside of the fuel cell system along with the water accumulated in the gas/liquid separation device; and control means for controlling an opening/closing operation of the discharge valve. The control means estimates an amount of water accumulated in the gas/liquid separation device based on an amount of water generated in the fuel cell, which is calculated based on an amount of electric power generated by the fuel cell, and decides a closing time of the discharge valve based on the estimated amount of accumulated water.

In the fuel cell system according to the second aspect, the water in the fuel cell system is generated by an electrochemical reaction in the fuel cell. It is therefore possible to obtain an accurate amount of accumulated water without using a water level sensor, by calculating the amount of generated water based on the amount of electric power generated by the fuel cell and then estimating the amount of water accumulated in the gas/liquid separation water based on the amount of generated water. Also, unlike the case where the water level sensor is used, an accurate amount of accumulated water can be obtained without being affected by external causes such as a tilt and vibration of a vehicle. According to the second aspect of the invention, it is possible to discharge the water accumulated in the gas/liquid separation device by a desired amount, by deciding the closing time of the discharge valve based on such an accurate estimated amount of accumulated water.

The fuel cell system may further include upstream portion pressure detecting means for detecting pressure at the portion upstream of the discharge valve before the discharge valve is opened; and correcting means for correcting the closing time of the discharge valve based on the detected pressure at the portion upstream of the discharge valve.

An amount of discharged fuel gas changes according to a pressure difference between the portion upstream of the discharge valve and a portion downstream of the discharge valve. With this fuel cell system, the closing time of the discharge valve is corrected based on the pressure at the portion upstream of the discharge valve before the discharge valve is opened. It is therefore possible to discharge a desired amount of fuel gas.

Also, an amount of discharged accumulated water changes according to the pressure difference between the portion upstream of the discharge valve and the portion downstream of the discharge valve. With the fuel cell system, the closing time of the discharge valve is corrected based on the pressure at the portion upstream of the discharge valve before the discharge valve is opened. It is therefore possible to discharge a desired amount of water.

The control means may decide an opening time at which the discharge valve is opened (hereinafter, referred to as an "opening time of the discharge valve") based on the estimated amount of accumulated water.

The fuel cell system may further include downstream portion pressure detecting means for detecting pressure at the portion downstream of the discharge valve before the discharge valve is opened. The correcting means may correct the closing time of the discharge valve based on the pressure at the portion upstream of the discharge valve and the pressure at the portion downstream of the discharge valve.

With the fuel cell system, the closing time of the discharge valve is corrected based on both the pressure at the portion upstream of the discharge valve and the pressure at the portion downstream of the discharge valve before the discharge valve is opened. It is therefore possible to further reliably discharge the desired amount of fuel gas. Also, the closing time of the discharge valve is corrected based on both the pressure at the portion upstream of the discharge valve and the pressure at the portion downstream of the discharge valve before the discharge valve is opened. It is therefore possible to further reliably discharge the desired amount of water.

In the fuel cell system according to the first aspect, the discharge valve may include an upstream side discharge valve and a downstream side discharge valve which are provided in series. Also, the control means may estimate a change in the pressure at the portion upstream of the discharge valve based on a change in pressure in a passage between the upstream side discharge valve and the downstream side discharge valve when the downstream side discharge valve is opened after the upstream side discharge valve is opened. The control means may obtain time, which has elapsed since the pressure in the passage is decreased to a predetermined value after the downstream side discharge valve is opened, as a parameter value corresponding to the integral value.

In the case where the discharge valve includes the upstream side discharge valve and the downstream side discharge valve which are provided in series, if the downstream side discharge valve is opened after the upstream side discharge valve is opened, the pressure in the passage between the upstream side discharge valve and the downstream side discharge valve gradually decreases as the accumulated water is discharged from the downstream side discharge valve. A change in the pressure at the portion upstream of the upstream side discharge valve during this period is so small that the change can be ignored. When the accumulated water is completely discharged and the fuel gas starts to be discharged from the downstream side discharge valve, the pressure in the passage becomes substantially constant, and the pressure at the portion upstream of the upstream side discharge valve decreases according to the amount of discharged fuel gas. As described so far, the change in the pressure in the passage between the upstream side discharge valve and the downstream side discharge valve is linked to the change in the pressure at the portion upstream of the upstream side discharge valve. It is therefore possible to estimate the change in the pressure at the portion upstream of the upstream side discharge valve based on the change in the pressure in the passage between the upstream side discharge valve and the downstream side discharge valve. The pressure at the portion upstream of the upstream side discharge valve changes at a substantially constant speed when the fuel gas is discharged. It is therefore possible to accurately estimate the integral value based on time which has elapsed since the pressure in the passage between the upstream side discharge valve and the downstream side discharge valve becomes a substantially constant value. With the fuel cell system, it is possible to accurately estimate the amount of discharged fuel gas without performing integration, by obtaining the time, which has elapsed since the pressure in the passage between the upstream side discharge valve and the downstream side discharge valve is decreased to the predetermined value after the downstream side discharge valve is opened, as the parameter value corresponding to the integral value.

The fuel cell system may further include failure determining means for determining whether a failure has occurred in at least one of the upstream side discharge valve and the downstream side discharge valve based on how the pressure in the passage changes when the upstream side discharge valve and the downstream discharge valve are closed at different times.

In the case where the discharge valve includes the upstream side discharge valve and the downstream side discharge valve which are provided in series, how the pressure in the passage changes when the upstream side discharge valve and the downstream side discharge valve are closed at different times varies between the case where a failure has occurred in at least one of the upstream side discharge valve and the downstream side discharge valve and the case where there is no failure in these discharge valves. With the fuel cell system, it is possible to determine whether a failure has occurred in the discharge valve easily and accurately, by determining whether a failure has occurred in at least one of the upstream side discharge valve and the downstream side discharge valve based on how the pressure in the passage changes.

In the fuel cell system, the failure determining means may determine that a failure has occurred in closing of the upstream side discharge valve, when an amount of increase in the pressure in the passage is equal to or larger than a predetermined value in the case where the downstream side discharge valve is closed after the upstream side discharge valve is closed.

Particularly, when the downstream side discharge valve is closed after the upstream side discharge valve is closed, if both the upstream side discharge valve and the downstream side discharge valve are operating properly, the pressure in the passage is substantially constant. However, if a failure such as gas leakage from the upstream side discharge valve has occurred, the pressure in the passage gradually increases. Accordingly, as in the case of this fuel cell system, it is possible to determine whether a failure has occurred in closing of the upstream side discharge valve easily and accurately, by determining that a failure has occurred in closing of the upstream side discharge valve if the amount of increase in the pressure in the passage is equal to or larger than the predetermined value.

In the fuel cell system, the failure determining means may determine that a failure has occurred in closing of the downstream side discharge valve when an amount of decrease in the pressure in the passage is equal to or larger than a predetermined value in the case where the upstream side discharge valve is closed after the downstream side discharge valve is closed.

When the upstream side discharge valve is closed after the downstream side discharge valve is closed, if both the upstream side discharge valve and the downstream side discharge valve are operating properly, the pressure in the passage is substantially constant. However, if a failure such as gas leakage from the downstream side discharge valve has occurred, the pressure in the passage gradually decreases. Accordingly, as in the case of this fuel cell system, it is possible to determine whether a failure has occurred in closing of the downstream side discharge valve easily and accurately, by determining that a failure has occurred in closing of the downstream side discharge valve if the amount of decrease in the pressure in the passage is equal to or larger than the predetermined value.

In the fuel cell system, the failure determining means may determine that a failure has occurred in opening of the downstream side discharge valve when an amount of decrease in the pressure in the passage is equal to or smaller than a predetermined value in the case where the upstream side discharge valve is closed before the downstream side discharge valve is closed.

When the upstream side discharge valve is closed before the downstream side discharge valve is closed, if both the upstream side discharge valve and the downstream side discharge valve are operating properly, the pressure in the passage decreases as the upstream side discharge valve is closed. However, if a failure has occurred in opening of the downstream side discharge valve, the amount of decrease in the pressure in the passage becomes small. Accordingly, as in the case of this fuel cell system, it is possible to determine whether a failure has occurred in opening of the downstream side discharge valve easily and accurately, by determining that a failure has occurred in opening of the downstream side discharge valve when the amount of decrease in the pressure in the passage is equal to or larger than the predetermined value.

In the fuel cell system, the failure determining means may determine that a failure has occurred in opening of the upstream side discharge valve when an amount of increase in the pressure in the passage is equal to or smaller than a predetermined value in the case where the downstream side discharge valve is closed before the upstream side discharge valve is closed.

When the downstream side discharge valve is closed before the upstream side discharge valve is closed, if both the upstream side discharge valve and the downstream side discharge valve are operating properly, the pressure in the passage increases as the downstream side discharge valve is closed. However, if a failure has occurred in opening of the upstream side discharge valve, the amount of increase in the pressure in the passage becomes small. Accordingly, as in the case of this fuel cell system, it is possible to determine whether a failure has occurred in opening of the upstream side discharge valve easily and accurately, by determining that a failure has occurred in opening of the upstream side discharge valve when the amount of increase in the pressure in the passage is equal to or smaller than the predetermined value.

A third aspect of the invention relates to a control method for a fuel cell system including a gas/liquid separation device which is provided in an off-gas passage that is a passage through which fuel gas discharged from a fuel cell passes, and which separates water from the fuel gas and accumulates the water; and a discharge valve which is connected to the gas/liquid separation device and which can discharge the fuel gas to an outside of the fuel cell system along with the water accumulated in the gas/liquid separation device. This control method includes the following steps of: obtaining an amount of change in pressure at a portion upstream of the discharge valve, which occurs due to an opening operation of the discharge valve; and deciding a closing time of the discharge valve based on an integral value obtained by integrating the amount of change in the pressure at the portion upstream of the discharge valve with respect to time from when the discharge valve is opened or a parameter value corresponding to the integral value. Note that obtaining the amount of change includes detection of the amount of change and estimation of the amount of change.

A fourth aspect of the invention relates to a control method for a fuel cell system including a gas/liquid separation device which is provided in an off-gas passage that is a passage through which fuel gas discharged from a fuel cell passes, and which separates water from the fuel gas and accumulates the water; and a discharge valve which is connected to the gas/liquid separation device and which can discharge the fuel gas to an outside of the fuel cell system along with the water accumulated in the gas/liquid separation device. This control method includes the following steps of: estimating an amount of water accumulated in the gas/liquid separation device based on an amount of water generated in the fuel cell, which is calculated based on an amount of electric power generated by the fuel cell; and deciding a closing time of the discharge valve based on the estimated amount of accumulated water.

A fifth aspect of the invention relates to a fuel cell system including a fuel cell which generates electric power by being supplied with hydrogen and oxygen; an off-gas passage through which fuel gas discharged from the fuel cell passes; a gas/liquid separation device which is provided in the fuel off-gas passage and which separates water from the fuel gas and accumulates the water; a discharge valve which is connected to the gas/liquid separation device and which can discharge the fuel gas to an outside of the fuel cell system along with the water accumulated in the gas/liquid separation device; and a controller that controls an opening/closing operation of the discharge valve. The controller detects or estimates a change in pressure at a portion upstream of the discharge valve, which occurs due to an opening operation of the discharge valve, and decides a closing time at which the discharge valve is closed (hereinafter, referred to as "a closing time of the discharge valve") based on an integral value obtained by integrating an amount of change in the pressure at the portion upstream of the discharge valve with respect to time from when the discharge valve is opened or a parameter value corresponding to the integral value.

A sixth aspect of the invention relates to a fuel cell system including a fuel cell which generates electric power by being supplied with hydrogen and oxygen; an off-gas passage through which fuel gas discharged from the fuel cell passes; a gas/liquid separation device which is provided in the fuel off-gas passage and which separates water from the fuel gas and accumulates the water; a discharge valve which is connected to the gas/liquid separation device and which can discharge the fuel gas to an outside of the fuel cell system along with the water accumulated in the gas/liquid separation device; and a controller that controls an opening/closing operation of the discharge valve. The controller estimates an amount of water accumulated in the gas/liquid separation device based on an amount of water generated in the fuel cell, which is calculated based on an amount of electric power generated by the fuel cell, and decides a closing time of the discharge valve based on the estimated amount of accumulated water.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 14 is a timing chart for describing a method of determining whether a failure has occurred in closing of the discharge valve according to the seventh embodiment of the invention; and FIG. 15 is a timing chart for describing a method of determining whether a failure has occurred in closing of the discharge valve according to an eighth embodiment of the invention.

DETAILED DESCRIPTION OF THE PREFERRED EMBODIMENTS

Hereafter, a first embodiment of the invention will be described with reference to FIGS. 1 to 4. A fuel cell system according to the invention can be applied to, for example, a fuel cell system for a vehicle, which is mounted in a vehicle. Note that the fuel cell system according to the invention can be applied to a fuel cell system for another use.

Figure 1:
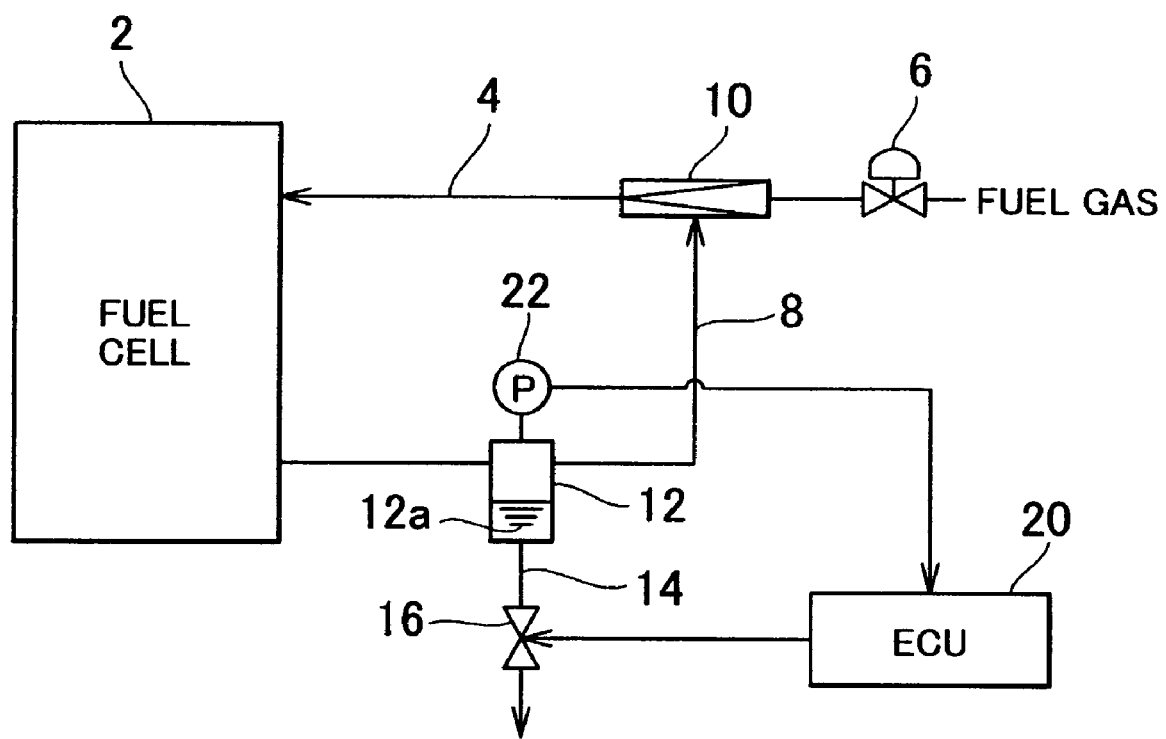
FIG. 1 is a diagram schematically showing a structure of a fuel cell system according to a first embodiment of the invention.

FIG. 1 is a diagram schematically showing a structure of a fuel cell system according to a first embodiment of the invention. As shown in FIG. 1, the fuel cell system includes a fuel cell 2 as electric power supply means. The fuel cell 2 has a structure in which an electrolyte membrane such as a polymer electrolyte membrane is interposed between an anode and a cathode which are catalytic electrodes (the electrolyte membrane, the anode, and the cathode are not shown in FIG. 1). The fuel cell 2 generates electric power when fuel gas containing hydrogen is supplied to the anode and oxidizing gas containing oxygen such as air is supplied to the cathode.

A fuel gas passage 4 is connected to an anode inlet of the fuel cell 2. A fuel gas supply device such as a hydrogen tank or a reformer (not shown) is connected to the fuel gas passage 4 on an upstream side. The fuel cell 2 is supplied with fuel gas from the fuel gas supply device. A pressure regulator valve 6 is provided in the fuel gas passage 4. The pressure of the fuel gas supplied from the fuel gas supply device is decreased by the pressure regulator valve 6 so as to be adjusted to a desired pressure, and the fuel gas having the desired pressure is supplied to the fuel cell 2. Also, an ejector 10 is provided in the fuel gas passage 4 at a position downstream of the pressure regulator valve 6.

An anode off-gas passage 8 for discharging off-gas of the fuel gas is connected to an anode outlet of the fuel cell 2. An end of the anode off-gas passage 8 on the downstream side is connected to the fuel gas passage 4 through the ejector 10. The fuel gas in the anode off-gas passage 8 is taken in the ejector 10 due to a suction effect of the fuel gas emitted from a nozzle of the ejector 10, and is re-supplied to the fuel gas passage 4. Thus, in the fuel cell system, the fuel gas is circulated through the fuel gas passage 4 and the anode off-gas passage 8 when the fuel cell 2 is operating.

A gas/liquid separation device 12 is provided in the anode off-gas passage 8. The gas/liquid separation device 12 separates water from the off-gas of the fuel gas, and includes a water accumulation tank 12a in which the water separated from the off-gas is accumulated. In the fuel cell system, the water generated due to electric power generation of the fuel cell 2 permeates through the electrolyte membrane from the cathode side, and leaks to the anode side. The water moved to the anode side is discharged to the anode off-gas passage 8 along with the off-gas of the fuel gas, and is collected in the gas/liquid separation device 12.

A discharge passage 14, which permits communication with the outside of the fuel cell system, is connected to a bottom portion of the water accumulation tank 12a of the gas/liquid separation device 12. A discharge valve 16 is provided in the discharge passage 14. The discharge valve 16 is usually closed, and is opened as required when a control signal from an after-mentioned ECU (electronic control unit) 20 is input. As the discharge valve 16, a valve which can control a discharge state, for example, a shut-off valve or a flow amount regulation valve, is employed. In the embodiment, a shut-off valve is used as the discharge valve 16. The discharge valve 16 serves as a water discharge valve which discharges the water accumulated in the gas/liquid separation device 12 to the outside of the fuel cell system.

An oxidizing gas passage for supplying oxidizing gas is connected to a cathode inlet of the fuel cell 2, and a cathode off-gas passage for discharging the off-gas of the oxidizing gas is connected to a cathode outlet. Since these portions are not characteristic portions of the fuel cell system, they are not shown in FIG. 1

In the fuel cell 2, the oxidizing gas on the cathode side permeates through the electrolyte membrane and leaks to the anode side due to an operation of the fuel cell 2. Therefore, in a system in which fuel gas is circulated such as the fuel cell system according to the embodiment, nitrogen contained in oxidizing gas is gradually accumulated in a circulation system. An increase in nitrogen concentration in the circulation system reduces power generation performance of the fuel cell 2. Accordingly, it is necessary to discharge nitrogen from the circulation system to the outside of the fuel cell system along with the fuel gas periodically or when a predetermined condition is satisfied so as to decrease the nitrogen concentration in the circulation system. In the fuel cell system, the fuel gas is discharged from the circulation system by using the discharge valve 16. The discharge valve 16 also serves as an exhaust valve for discharging the fuel gas to the outside of the fuel cell system in addition to serving as a water discharge valve as mentioned above.

When the discharge valve 16 is used as an exhaust valve, it is necessary to accurately control the amount of discharged fuel gas. When the amount of discharged fuel gas is less than a desired value, the hydrogen concentration of the fuel gas cannot be recovered sufficiently. On the other hand, when the amount of discharged fuel gas exceeds the desired value, the fuel gas is unnecessarily consumed by an excessive amount, which causes deterioration of fuel efficiency. Therefore, in the fuel cell system, in order to reliably and accurately discharge the desired amount of fuel gas, the amount of fuel gas discharged due to an opening operation of the discharge valve 16 is estimated, and the operation of the discharge valve 16 is controlled based on the estimated amount of discharged fuel gas. Hereafter, a method of estimating the amount of discharged fuel gas and a method of controlling the discharge valve 16 according to the embodiment will be described in detail.

First, the method of estimating the amount of discharged fuel gas will be described. The fuel cell system includes the ECU 20 as a control unit for controlling the discharge valve 16. A pressure sensor 22 which is provided for the gas/liquid separation device 12 and which detects pressure in the gas/liquid separation device 12 is connected to the ECU 20 on the input side. The ECU 20 estimates the amount of discharged fuel gas based on a detection signal from the pressure sensor 22 according to the following method.

Figure 2:
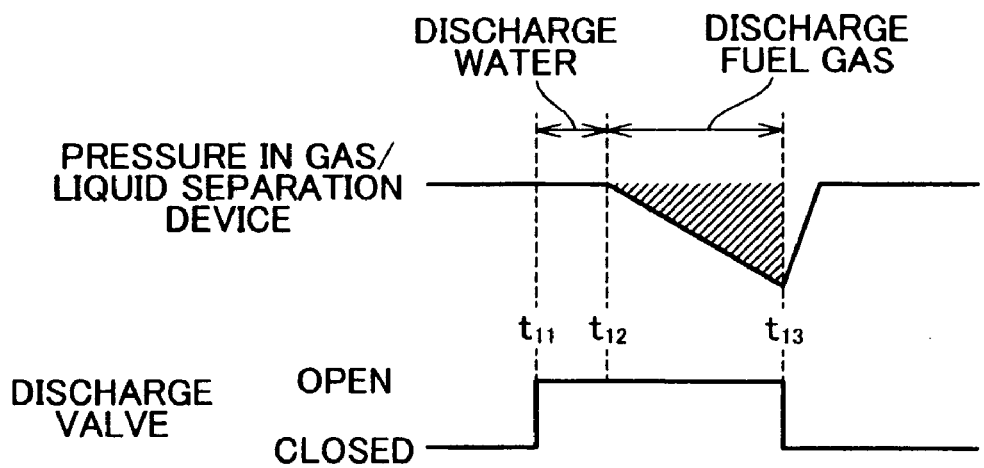
FIG. 2 is a timing chart for describing a method of estimating an amount of discharged fuel gas according to the first embodiment of the invention.

FIG. 2 is a timing chart showing a relationship between an operation state of the discharge valve 16 and a change in pressure in the gas/liquid separation device 12. As shown in FIG. 2, a change in the pressure in the gas/liquid separation device 12 does not occur immediately after the discharge valve 16 is opened, and the change starts some time after the discharge valve 16 is opened. A time lag from when the discharge valve 16 is opened (time t11) until when the pressure in the gas/liquid separation device 12 starts to change (time t12) indicates that the accumulated water is discharged from the gas/liquid separation device 12 during the time lag period. The pressure in the gas/liquid separation device 12 actually changes even when the accumulated water is being discharged. However, the amount of accumulated water is so small with respect to the entire amount of gas in the circulation system. Therefore, the change in pressure due to discharge of the accumulated water is so small as compared to the change in the pressure due to discharge of the fuel gas that the change due to discharge of the accumulated water can be ignored. The pressure in the gas/liquid separation device 12 drastically changes after the water has been completely discharged from the discharge passage 14 and communication between the inside of the gas/liquid separation device 12 and the atmosphere is permitted.

Figure 3:
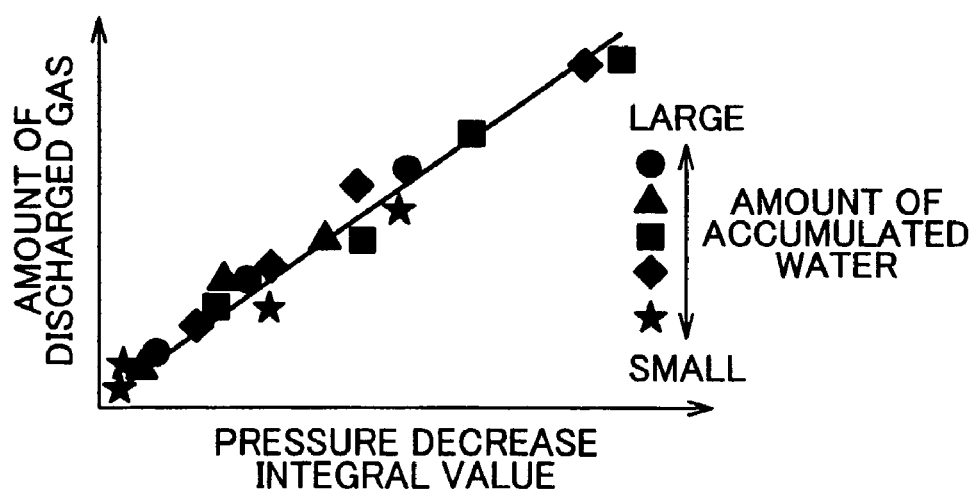
FIG. 3 is a graph showing a relationship between an integral value obtained by integrating an amount of decrease in pressure with respect to time from when a discharge valve is opened and an amount of discharged fuel gas, the relationship being obtained by an experiment.

When the water is completely discharged from the discharge passage 14 and communication between the inside of the gas/liquid separation device 12 and the atmosphere is permitted, the pressure in the gas/liquid separation device 12 gradually decreases as the fuel gas is discharged through the discharge passage 14. The amount of fuel gas discharged from the circulation system to the outside of the fuel cell system at this time is represented by the integral value obtained by integrating the amount of decrease in the pressure in the gas/liquid separation device 12 with respect to time from when the discharge valve 16 is opened. The final amount of discharged fuel gas is represented by the integral value (an area of the shaded region in FIG. 2) obtained during an integration period from when the discharge valve 16 is opened (time t11) until when the discharge valve 16 is closed (time t13). FIG. 3 is a graph showing a relationship between the integral value obtained by integrating the amount of decrease in the pressure in the gas/liquid separation device 12 with respect to time from when the discharge valve 16 is opened (hereinafter referred to as a "pressure decrease integral value" where appropriate) and the amount of discharged fuel gas (hereinafter, referred to as a "fuel gas discharge amount" where appropriate), the relationship being obtained by an experiment. This graph indicates that the pressure decrease integral value and the fuel gas discharge amount are in a proportional relationship, and the fuel gas discharge amount can be accurately estimated by obtaining the pressure decrease integral value. In addition, the graphs indicates that the proportional relationship between the pressure decrease integral value and the fuel gas discharge amount is constant regardless of the amount of water accumulated in the gas/liquid separation device 12. In the fuel cell system, a value is obtained which indicates an amount of decrease in the pressure in the gas/liquid separation device from when the discharge valve 16 is opened, and the amount of discharged fuel gas is estimated based on the integral value obtained by integrating the amount of decrease in the pressure with respect to time from when the discharge valve 16 is opened.

According to the method of estimating the amount of discharged fuel gas according to the embodiment, it is possible to accurately estimate the amount of fuel gas discharged from when the discharge valve 16 is opened without being affected by the amount of water accumulated in the gas/liquid separation device 12. In addition, it is possible to accurately estimate the amount of discharged fuel gas without using an expensive sensor such as a flow amount sensor. The ECU 20 controls the operation of the discharge valve 16 according to the above-mentioned method of estimating the amount of discharged fuel gas.

Figure 4:
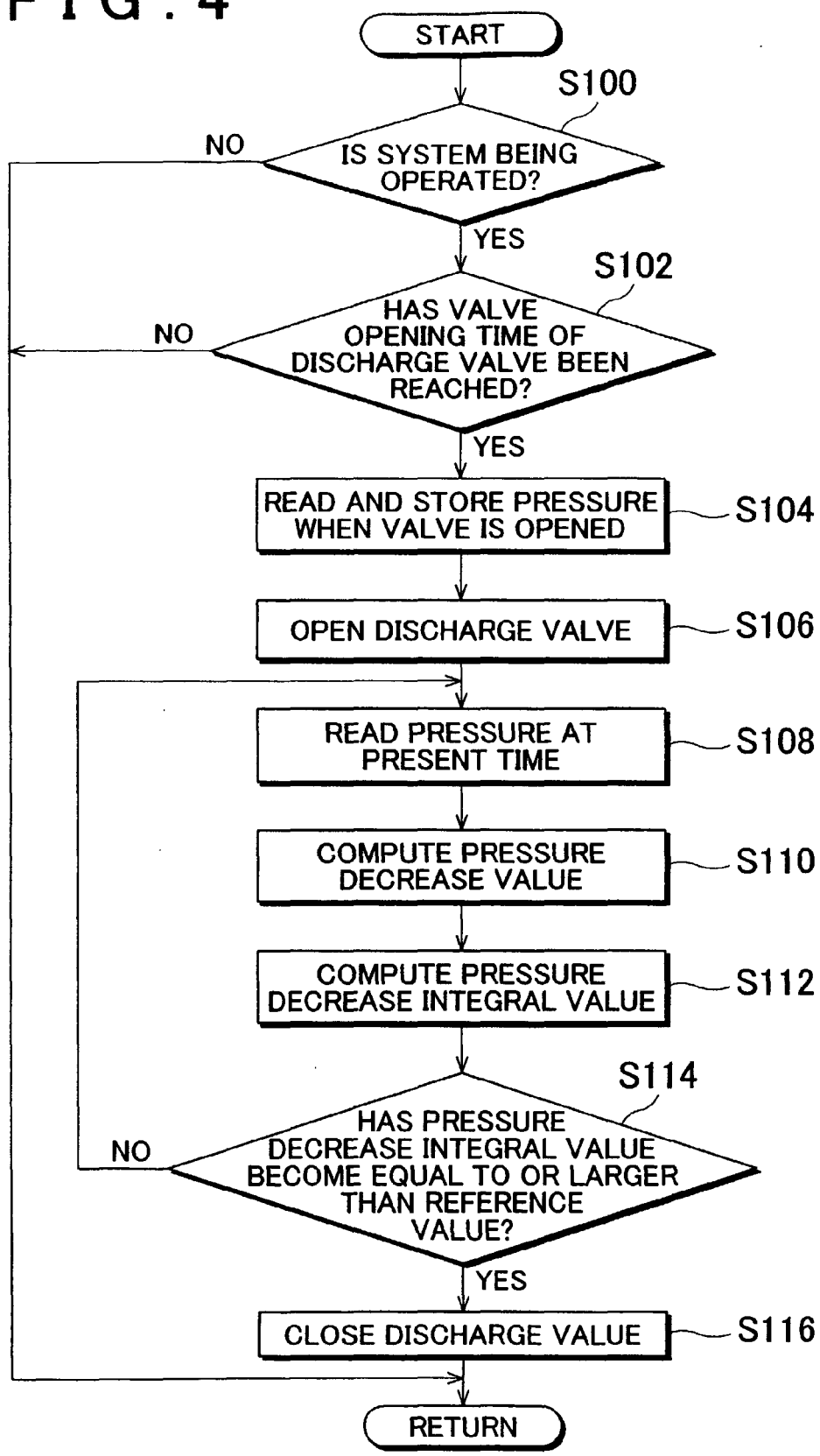
FIG. 4 is a flowchart showing a routine of opening/closing control of a discharge valve which is performed in the first embodiment of the invention.

Next, the method of controlling the discharge valve 16 will be described. FIG. 4 is a flowchart for describing a series of operation of the opening/closing control for the discharge valve 16 which is performed by the ECU 20 in the embodiment. In the routine shown in FIG. 4, first, it is determined in step S100 whether the fuel cell system is being operated at present time, since the accumulated water and the fuel gas containing nitrogen are discharged during the operation of the system. When it is determined that the fuel cell system is being operated at present time, step S102 and the following steps are performed.

In step S102, it is determined whether the opening time of the discharge valve 16 has been reached. Setting of the opening time of the discharge valve 16 is not particularly limited. The discharge valve 16 is opened when a predetermined valve opening condition is satisfied, for example, when the time which has elapsed since the previous operation has reached a predetermined value. When it is determined in step S102 that the opening time of the discharge valve 16 has been reached, the pressure in the gas/liquid separation device 12 is detected by the pressure sensor 22 in step S104, and then the discharge valve 16 is opened in step S106. The pressure in the gas/liquid separation device 12 detected in step S104 is stored in memory of the ECU 20 as the initial pressure.

After the discharge valve 16 is opened, the pressure in the gas/liquid separation device 12 is read by the pressure sensor 22 in step S108. Then, the difference between the initial pressure stored in the memory and the pressure in the gas/liquid separation device 12 at present time, that is, the pressure decrease value is computed in step S510. Then, in step S112, the pressure decrease integral value is computed by integrating the pressure decrease value obtained in step S110 with respect to time.

The pressure decrease integral value obtained in step S112 represents the amount of fuel gas which has been discharged from the circulation system by present time, as described above. In step S114, in order to determine whether the amount of fuel gas which has been discharged by present time has reached a desired value, comparison between the pressure decrease integral value obtained in step S112 and a predetermined reference value is made. The reference value is decided based on the desired fuel gas discharge amount. The desired fuel gas discharge amount may be a preset fixed value, or may be set based on the operating state of the fuel cell system. When it is determined in step S114 that the pressure decrease integral value has not reached the reference value, step S108 is performed again, and steps S108 to S112 are repeatedly performed until an affirmative determination is made in step S114.

When it is determined in step S114 that the pressure decrease integral value has reached the reference value, the discharge valve 16 is closed in step S116. Thus, discharge of the fuel gas from the circulation system to the outside of the fuel cell system is stopped, and the final amount of discharged fuel gas is determined.

When the above-mentioned routine is performed, the water accumulated in the gas/liquid separation device 12 is reliably discharged. Whether the accumulated water is reliably discharged can be checked by an increase in the pressure decrease integral value. Also, the final fuel gas discharge amount is the fuel gas discharge amount when the pressure decrease integral value reaches the reference value, and the reference value is decided based on the desired fuel gas discharge amount. Accordingly, when an affirmative determination is made in step S114 and step S116 is performed, the fuel gas is reliably discharged by a desired amount.

In the above-mentioned routine, the reference value used in the determination in step S114 may be set based on the initial pressure obtained in step S104. For example, the reference value is read from a map using the initial pressure as a parameter value. The fuel gas discharge amount changes according to a pressure difference between the portion upstream of the discharge valve 16 and the portion downstream of the discharge valve 16. Therefore, setting the reference value based on the initial pressure makes it possible to accurately estimate the fuel gas discharge amount, and more reliably discharge the fuel gas by the desired amount.

When a pressure sensor is provided also downstream of the discharge valve 16, the reference value used in the determination in step S114 may be set in consideration of the pressure at the portion downstream of the discharge valve 16 before the discharge valve 16 is opened. For example, the reference value is read from a map using the pressure at the portion upstream of the discharge valve 16 and the pressure at the portion downstream of the discharge valve 16 as parameter values, or a map using the pressure difference between the pressure at the portion upstream of the discharge valve 16 and the pressure at the portion downstream of the discharge valve 16 as a parameter value. The fuel gas discharge amount changes according to the pressure difference between the pressure at the portion upstream of the discharge valve 16 and the pressure at the portion downstream of the discharge valve 16. Accordingly, setting the reference value based on the pressure difference makes it possible to further accurately estimate the fuel gas discharge amount, and further reliably discharge the fuel gas by the desired amount.

Hereafter, a second embodiment of the invention will be described with reference to FIGS. 5 and 6.

Figure 5:
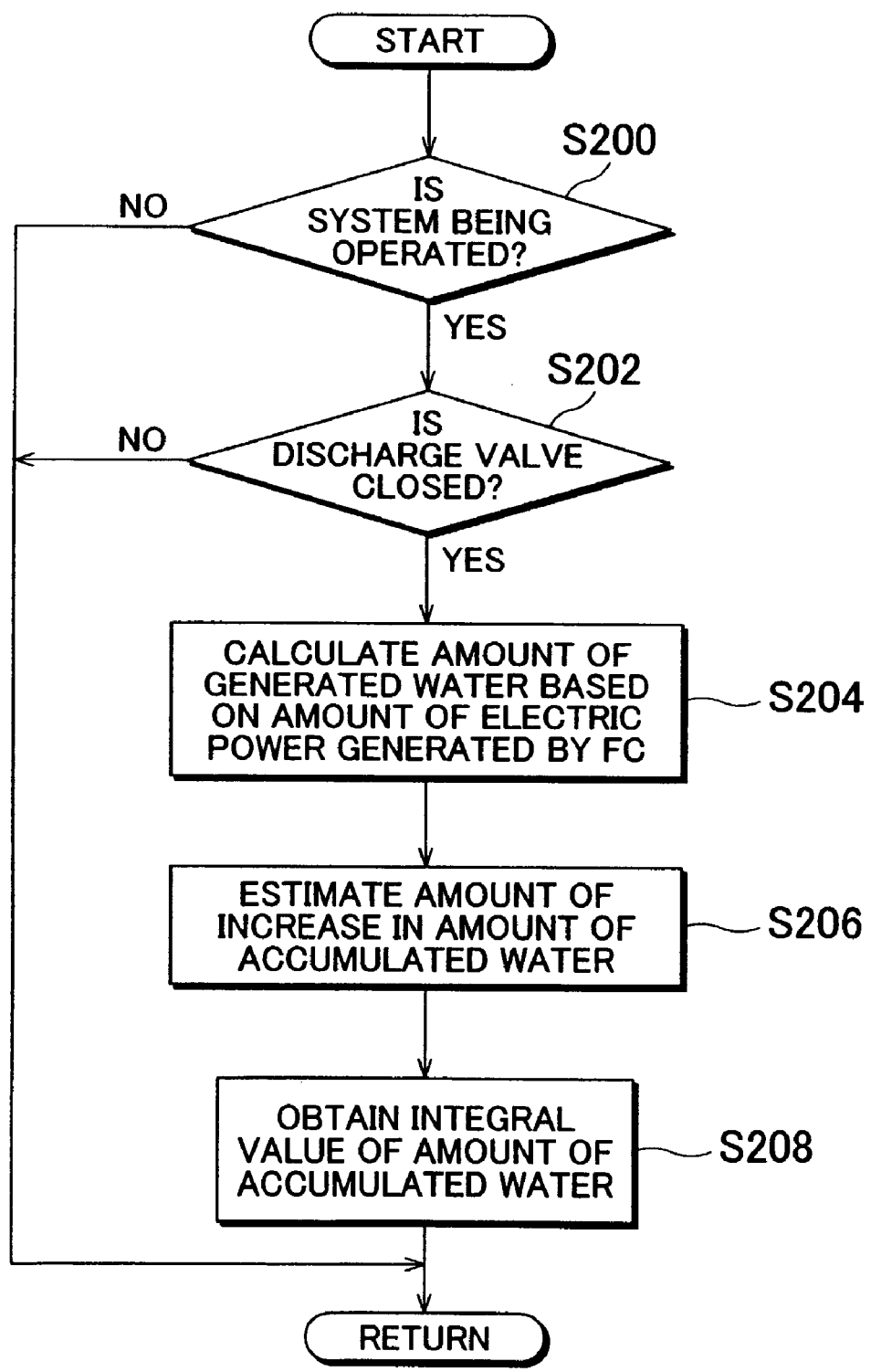
FIG. 5 is a flowchart showing a routine of estimation of an amount of accumulated water which is performed in a second embodiment of the invention.
Figure 6:
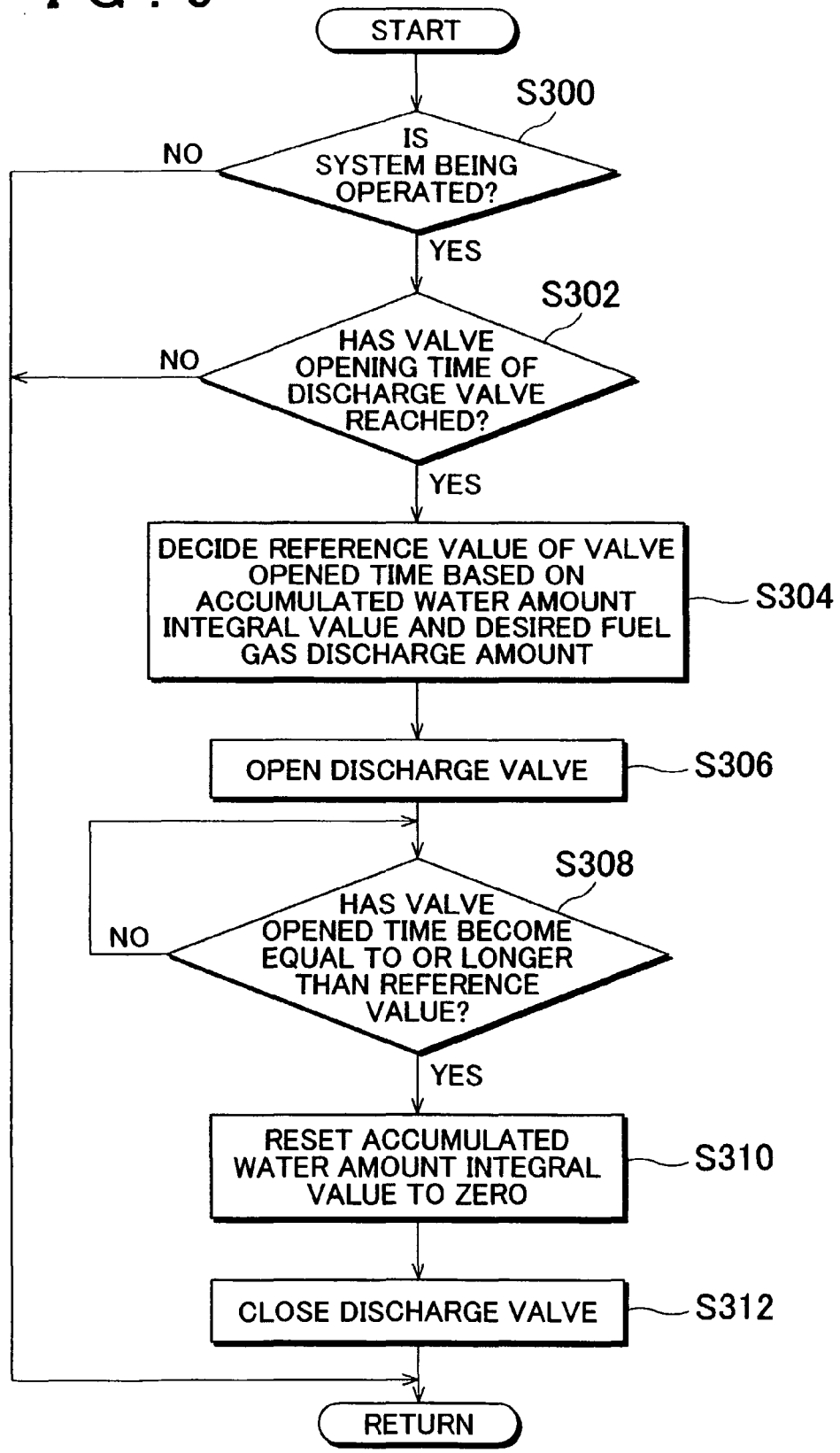
FIG. 6 is a flowchart showing a routine of opening/closing control of the discharge valve which is performed in the second embodiment of the invention.

The fuel cell system according to the second embodiment is the same as the fuel cell system according to the first embodiment except that the ECU 20 performs routines in FIGS. 5 and 6 instead of the routine in FIG. 4. The fuel cell system according to the first embodiment controls the operation of the discharge valve 16 based on the estimated amount of discharged fuel gas. However, the fuel cell system according to the second embodiment accurately estimates the amount of water accumulated in the gas/liquid separation device 12 and controls the operation of the discharge valve 16 based on the estimated amount of accumulated water. Hereafter, a method of estimating the amount of accumulated water and a method of controlling the discharge valve 16 according to the second embodiment will be described in detail.

First, the method of estimating the amount of accumulated water will be described. The water in the fuel cell system is generated due to an electrochemical reaction mainly at the cathode. Water and electric power are obtained by the electrochemical reaction, and an amount of generated water and an amount of generated electric power are in a proportional relationship. Therefore, when the amount of electric power generated by the fuel cell 2 is obtained, the amount of water generated at the cathode can be obtained based on the amount of generated electric power. Also, the amount of water accumulated in the gas/liquid separation device 12 can be estimated on the assumption that a constant proportion of the water generated at the cathode leaks to the anode side.

FIG. 5 is a flowchart for describing a series of operation for estimating the amount of accumulated water which is performed by the ECU 20 in the second embodiment. In the routine shown in FIG. 5, first, it is determined in step S200 whether the fuel cell system is being operated at present time, since the water in the fuel cell system is generated due to the operation of the system. When it is determined in step S200 that the fuel cell system is being operated at present time, it is determined in step S202 whether the discharge valve 16 is closed. Since the water in the gas/liquid separation device 12 is discharged to the outside of the fuel cell system when the discharge valve 16 is open, the discharge valve 16 needs to be closed in order to accumulate water in the gas/liquid separation device 12. When it is determined that the discharge valve 16 is closed, step S204 and the following steps are performed.

In step S204, the amount of water generated in a unit time (a cycle of the routine) is calculated according to the electric current (the amount of electric power) generated by the fuel cell 2. The amount of electric power generated by the fuel cell 2 is measured by an ammeter (not shown), and a current value signal is provided from the ammeter to the ECU 20. In step S206, the amount of water accumulated in the unit time is calculated based on the amount of generated water obtained in step S204 by using a predetermined relational expression or a predetermined map. In step S208, an integral value is obtained by integrating the amount of water accumulated in the unit time, which is obtained in step S204. The integral value corresponds to the total amount of water accumulated after the discharge valve 16 is closed. Steps S204 to S208 are repeatedly performed until the discharge valve 16 is opened. Thus, the newest amount of accumulated water constantly is calculated while the discharge valve 16 is closed. The obtained amount of accumulated water is stored in the memory of the ECU 20, and is updated to the newest value every time the calculation is performed.

When the above-mentioned routine is performed, it is possible to estimate the amount of water accumulated in the gas/liquid separation device 12 without providing a water level sensor. Also, it is possible to accurately estimate the amount of accumulated water constantly without being affected by external causes such as a tilt and vibration of the system, unlike the case where the water level sensor is used. The ECU 20 controls the operation of the discharge valve 16 based on the amount of water accumulated in the gas/liquid separation device 12 which is calculated in the above-mentioned routine.

In the above-mentioned routine, preferably, the relationship between the amount of generated water and the amount of accumulated water is decided based on a temperature of the fuel cell 2, when the amount of accumulated water is calculated based on the amount of generated water. The water permeation characteristic of the electrolyte membrane changes according to the temperature thereof. Therefore, deciding the relationship between the amount of generated water and the amount of accumulated water based on the temperature of the fuel cell 2 makes it possible to further accurately estimate the amount of accumulated water.

Next, the method of controlling the discharge valve 16 will be described. FIG. 6 is a flowchart for describing a series of operation of the opening/closing control of the discharge valve 16 which is performed by the ECU 20 in the second embodiment. The ECU 20 performs the routine shown in FIG. 6 in parallel with the routine shown in FIG. 5. In the routine shown in FIG. 6, first, it is determined in step S300 whether the fuel cell system is being operated at present time, since the accumulated water and the fuel gas containing nitrogen are discharged during the operation of the system. When it is determined in step S300 that the fuel cell system is being operated at present time, step S302 and the following steps are performed.

In step S302, it is determined whether a predetermined valve opening condition is satisfied, for example, time which has elapsed since the previous operation has reached a predetermined value. When it is determined in step S302 that the opening time of the discharge valve 16 has been reached, in step S304, a reference value of a time during which the discharge valve 16 is open (hereinafter, referred to as a "valve opened time of the discharge valve 16") is set based on the amount of water accumulated in the gas/liquid separation device 12 at present time and the desired fuel gas discharge amount. As the amount of accumulated water, the newest value obtained in the routine in FIG. 5 is read. The desired fuel gas discharge amount may be a fixed value set in advance, or may be set based on the operating state of the fuel cell system.

The reference value of the valve opened time of the discharge valve 16 is calculated according to a relational expression or a map using the amount of accumulated water and the desired fuel gas discharge amount as parameter values. In the timing chart in FIG. 2, the valve opened time of the discharge valve 16 is divided into a water discharge period and a fuel gas discharge period. The water discharge period is decided based on the amount of accumulated water, and the fuel gas discharge period is decided based on the fuel gas discharge amount. Accordingly, if the relationship between the water discharge period and the amount of accumulated water and the relationship between the fuel gas discharge period and the fuel gas discharge amount are obtained in advance by an experiment or the like, when the amount of accumulated water and the desired fuel gas discharge amount are decided, it is possible to uniquely decide the valve opened time required to discharge the accumulated water and the desired amount of fuel gas.

After the reference value of the valve opened time is set, in step S306, the discharge valve 16 is opened and measurement of the time which has elapsed since the discharge valve 16 is opened is started. Then, it is determined in step S308 whether the valve opened time until present time has reached the reference valve set in step S304. Until an affirmative determination is made in step S308, the discharge valve 16 is kept open, the water accumulated in the gas/liquid separation device 12 is discharged, and the fuel gas in the circulation system is discharged.

When it is determined in step S308 that the valve opened time of the discharge valve 16 has reached the reference value, that is, when discharge of the water is finished, the accumulated water amount integral value which is obtained in the routine in FIG. 5 is reset to zero in step S310, and then the discharge valve 16 is closed in step S312. Thus, discharge of the fuel gas from the circulation system to the outside of the fuel cell system is stopped, and the final fuel gas discharge amount is determined. In the routine in FIG. 5, calculation (integration) of the amount of accumulated water is re-started from zero.

As in the case of the first embodiment, when the above-mentioned routine is performed, the water accumulated in the gas/liquid separation device 12 is reliably discharged, and the fuel gas is reliably discharged by the desired amount.

Hereafter, a third embodiment of the invention will be described with reference to FIG. 7.

Figure 7:
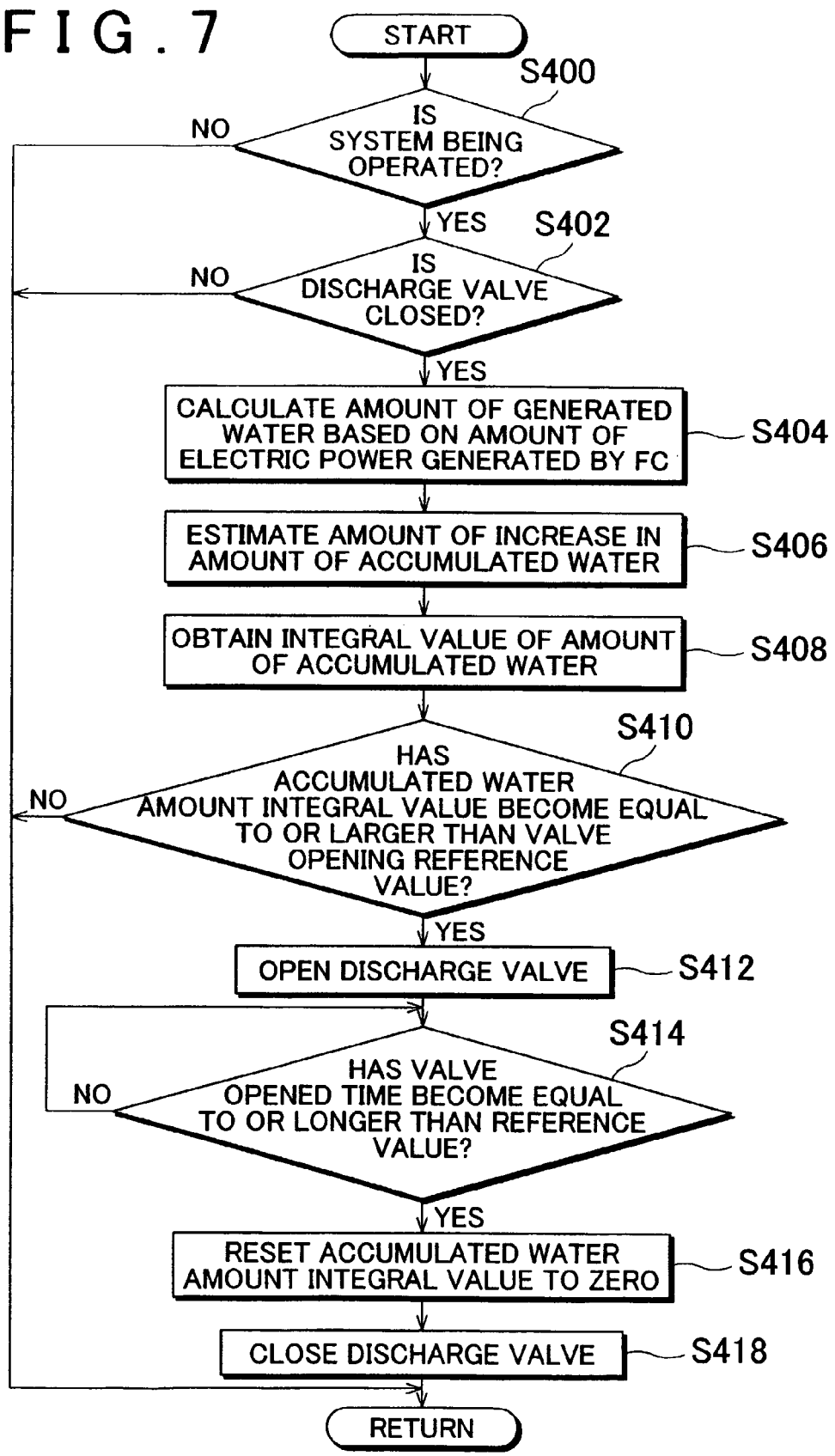
FIG. 7 is a flowchart showing a routine of opening/closing control of the discharge valve which is performed in a third embodiment of the invention.

The fuel cell system according to the third embodiment is the same as the fuel cell system according to the first embodiment except that the ECU 20 performs a routine in FIG. 7 instead of the routine in FIG. 4. As in the case of the system according to the second embodiment, the fuel cell system according to the third embodiment accurately estimates the amount of water accumulated in the gas/liquid separation device 12 and controls the operation of the discharge valve 16 based on the estimated amount of accumulated water. The system according to the second embodiment decides closing time of the discharge valve 16 based on the amount of accumulated water. However, the fuel cell system according to the third embodiment decides not only closing time but also opening time of the discharge valve 16 based on the amount of accumulated water. Hereafter, a method of controlling the discharge valve 16 according to the third embodiment will be described in detail. Note that a method of estimating the amount of accumulated water in the third embodiment is the same as that in the second embodiment. Therefore, the detailed description will not be made here.

The method of controlling the discharge valve 16 will be described. FIG. 7 is a flowchart for describing a series of operation of the opening/closing control of the discharge valve 16 which is performed by the ECU 20 in the third embodiment. In the routine shown in FIG. 7, first, it is determined in step S400 whether the fuel cell system is being operated at present time. When it is determined that the fuel cell system is being operated, it is determined in step S402 whether the discharge valve 16 is closed. When it is determined that the discharge valve 16 is closed, step S404 and the following steps are performed.

In step S404, the amount of water generated in the unit time (a cycle of the routine) is calculated based on the amount of electric power generated by the fuel cell 2. In step S406, the amount of water accumulated in the unit time is calculated based on the amount of generated water obtained in step S404 by using a predetermined relational expression or a predetermined map. At this time, preferably, the relationship between the amount of generated water and the amount of accumulated water is decided based on the temperature of the fuel cell 2, since the water permeation characteristic of the electrolyte membrane changes according to the temperature of the electrolyte membrane. In step S408, there is obtained the integral value obtained by integrating the amount of water accumulated in the unit time which is calculated in step S404, that is, the total amount of water which has been accumulated since the discharge valve 16 is closed.

The accumulated water amount integral value which is calculated in step S408 is compared with a predetermined reference value for the amount of accumulated water at which the discharge valve 16 is opened (hereinafter, referred to as a "valve opening reference value") in step S410. In the system according to the second embodiment, the discharge valve 16 is periodically opened. However, in the fuel cell system according to the third embodiment, the discharge valve 16 is opened when the amount of accumulated water reaches the valve opening reference value. In the fuel cell system, the opening time of the discharge valve 16 is decided based on the amount of water accumulated in the gas/liquid separation device 12. Steps S404 to S408 are repeatedly performed until the amount of accumulated water reaches the valve opening reference value.

When it is determined in step S410 that the amount of accumulated water reaches the valve opening reference value, the discharge valve 16 is opened and measurement of the time which has elapsed since the discharge valve 16 is opened is started in step S412. In step S414, it is determined whether the valve opened time until present time has reached a reference value. The reference value of the valve opened time of the discharge valve 16 is calculated by using a relational expression or a map using the valve opening reference value used in step S410 and a desired fuel gas discharge amount as parameter values. The water discharge period is decided based on the valve opening reference value, the fuel gas discharge period is decided based on the desired fuel gas discharge amount, and the period obtained by adding the water discharge period to the fuel gas discharge period is used as the reference value of the valve opened time.

When it is determined in step S414 that the valve opened time of the discharge valve 16 has reached the reference value, that is, when discharge of the water is finished, the accumulated water amount integral value obtained in step S408 is reset to zero in step S416, and the discharge valve 16 is closed in step S418. Thus, discharge of the fuel gas from the circulation system to the outside of the fuel cell system is stopped, and the final fuel gas discharge amount is obtained.

When the above-mentioned routine is performed, as in the case of the first embodiment and the second embodiment, the water accumulated in the gas/liquid separation device 12 is reliably discharged, and the fuel gas is reliably decreased by a desired amount. Also, according to the fuel cell system, the amount of water accumulated in the gas/liquid separation device 12 can be adjusted so as not to exceed the desired upper limit value (valve opening reference value).

A fourth embodiment of the invention will be described with reference to FIGS. 8 to 10.

Figure 8:
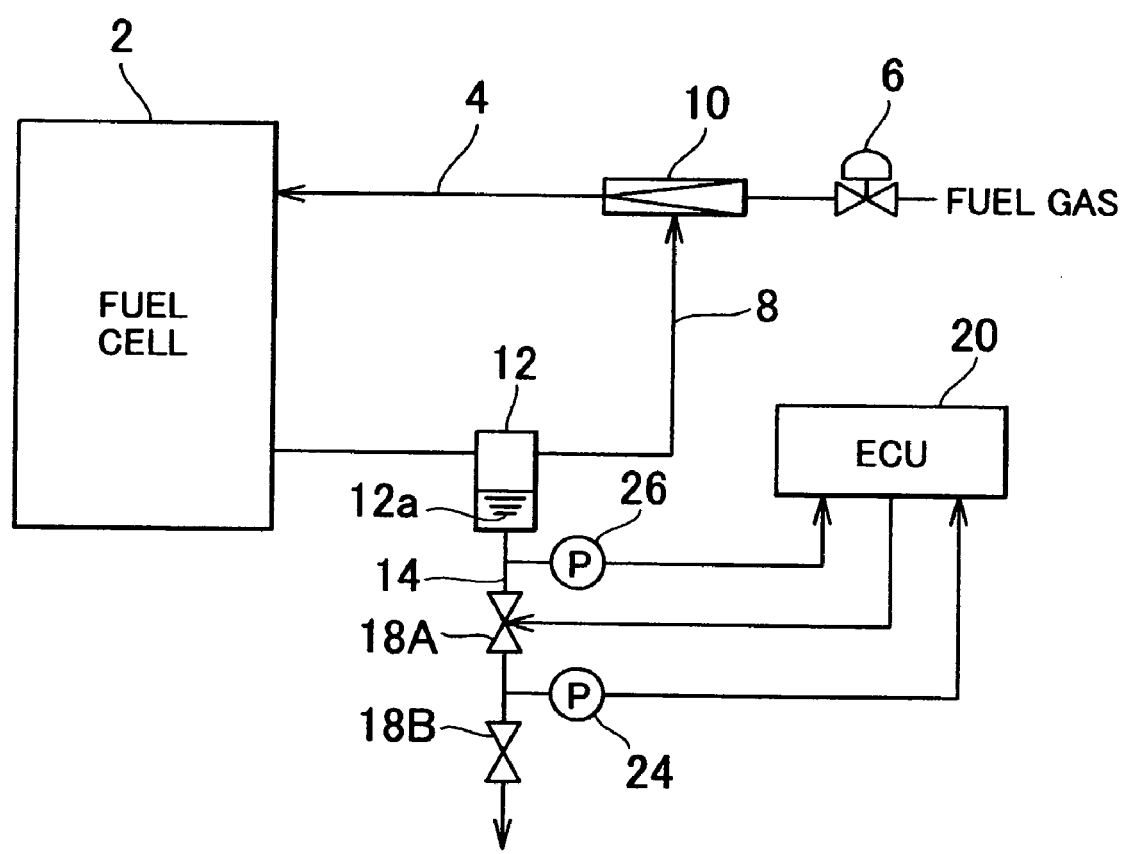
FIG. 8 is a diagram schematically showing a structure of a fuel cell system according to a fourth embodiment of the invention.

FIG. 8 is a diagram schematically showing a structure of a fuel cell system according to the fourth embodiment of the invention. In FIG. 8, the same elements as those in the first embodiment are assigned with the same reference numerals. The description of these elements will not be made here. The structure which is different from that of the system according to the first embodiment will be described in detail.

The structure of the fuel cell system will be described. The fuel cell system according to the fourth embodiment is the same as the system according to the first embodiment except for the structure of the discharge system of the gas/liquid separation device 12. In the fuel cell system according to the fourth embodiment, two discharge valves 18A and 18B are provided in series in the discharge passage 14 connected to the gas/liquid separation device 12. The fuel gas in the circulation system is discharged to the outside of the fuel cell system when both of the discharge valves 18A and 18B are opened. Since two discharge valves 18A and 18B are provided, even if a failure has occurred in one of these discharge valves 18A and 18B, leakage of hydrogen can be prevented.

The ECU 20 performs the opening/closing control of the discharge valve 18A and the opening/closing control of the discharge valve 18B independently of each other. In the fourth embodiment as well, in order to discharge a desired amount of fuel gas accurately and reliably, the ECU 20 estimates the amount of fuel gas discharged due to an opening operation of the discharge valves 18A and 18B, and controls the operations of the discharge valves 18A and 18B based on the estimated discharge amount. Hereafter, a method of estimating the fuel gas discharge amount and a method of controlling the discharge valves 18A and 18B according to the fourth embodiment will be described in detail.

A pressure sensor 24 is provided in the discharge passage 14 at a position between the discharge valves 18A and 18B, and a pressure sensor 26 is provided in the discharge passage 14 at a position upstream of the upstream side discharge valve 18A. Each of the pressure sensors 24 and 26 is connected to the ECU 20 on the input side, and inputs a signal corresponding the detected pressure in the ECU 20. In the first embodiment, the amount of fuel gas discharged from the circulation system is estimated based on the pressure in the gas/liquid separation device 12. However, in the fuel cell system according to the fourth embodiment, the amount of fuel gas discharged from the circulation system is estimated based on the pressure at a portion between the discharge valves 18A and 18B detected by one of the pressure sensors 24 and 26.

Figure 9:
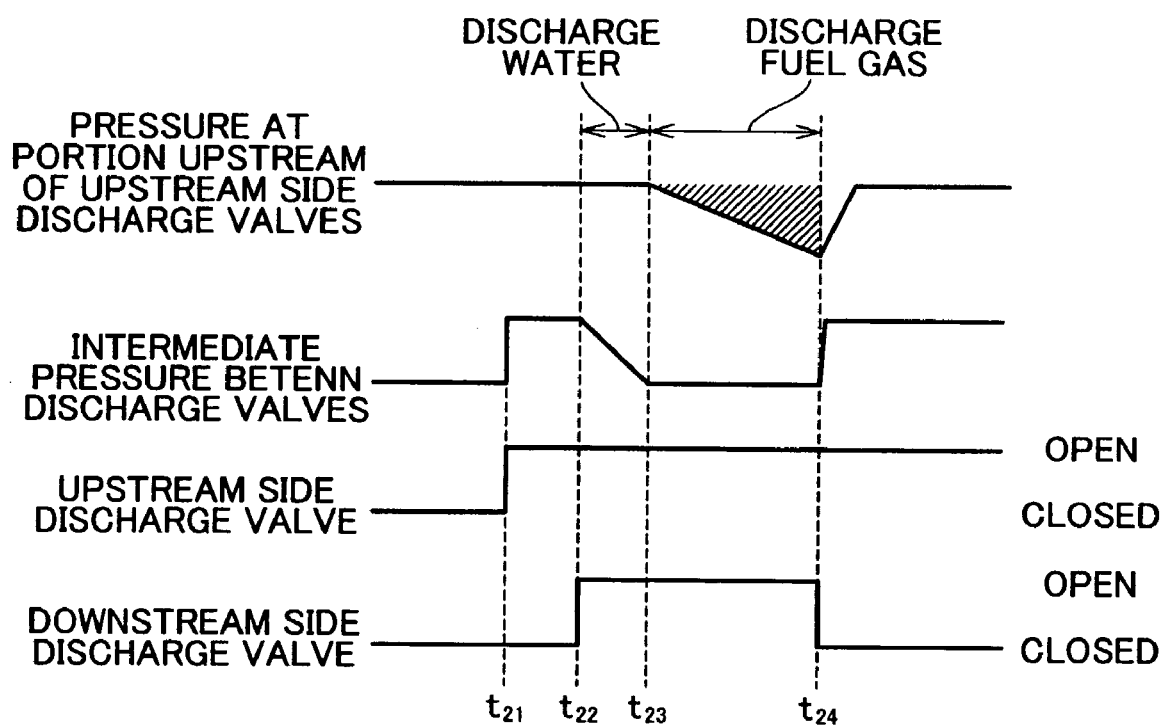
FIG. 9 is a timing chart for describing a method of estimating an amount of discharged fuel gas according to the fourth embodiment of the invention.

FIG. 9 is a timing chart showing a relationship among the operations of the discharge valves 18A and 18B, and a change in the pressure at the portion between the discharge valves 18A and 18B (hereinafter, referred to as "intermediate pressure") and a change in the pressure at the portion upstream of the upstream side discharge valve 18A (hereinafter, referred to as "upstream portion pressure"). As shown in FIG. 9, the ECU 20 initially opens the upstream side discharge valve 18A (time t21). The valve opening time of the upstream side discharge valve 18A is not particularly limited. For example, the upstream side discharge valve 18A is opened when a predetermined valve opening condition is satisfied, for example, when time which has elapsed since the previous operation has reached a predetermined value. When a predetermined time has elapsed since the upstream side discharge valve 18A is opened, the ECU 20 then opens the downstream side discharge valve 18B (time t22). The time lag from when the upstream side discharge valve 18A is opened until when the downstream side discharge valve 18B is opened is a sufficient time during which the intermediate pressure increases to a value substantially equal to the upstream portion pressure.

After the downstream side discharge valve 18B is opened, as the water accumulated in the gas/liquid separation device 12 is discharged through the downstream side discharge valve 18B, the intermediate pressure gradually decreases. As described in the first embodiment, the change in the upstream portion pressure while the accumulated water is discharged is so small that the change can be ignored. When the accumulated water is completely discharged and communication between the portion upstream of the upstream side discharge valve 18A and the outside of the fuel cell system is permitted, the intermediate pressure becomes a substantially constant value (equal to the outside pressure). When discharge of the fuel gas from the downstream side discharge valve 18B is started, the upstream portion pressure decreases according to the fuel gas discharge amount. As described so far, the change in the intermediate pressure is linked to the change in the upstream portion pressure, and the change in the upstream portion pressure can be estimated based on the change in the intermediate pressure.

As described in the first embodiment, the amount of fuel gas discharged due to an opening operation of the discharge valves 18A and 18B can be represented by the integral value obtained by integrating a decrease value of the pressure in the gas/liquid separation device 12 from when the downstream side discharge valve 18B is opened. The pressure in the gas/liquid separation device 12 is equal to the pressure at the portion upstream of the upstream side discharge valve 18A in the discharge passage 14. Accordingly, it is possible to estimate the amount of discharged fuel gas based on the change in the pressure detected by the pressure sensor 26 according to the method described in the first embodiment. The method of estimating the fuel gas discharge amount based on the pressure detected by the pressure sensor 26 is the same as that in the first embodiment. Therefore, the description will not be made here. Hereafter, a method of estimating the fuel gas discharge amount based on the intermediate pressure detected by the pressure sensor 24 will be described.

When the pressure detected by the pressure sensor 26 is used, the actual pressure decrease value is obtained and the integral value can be computed based on the pressure decrease value. In the estimation method, however, another value is used instead of the integral value. More particularly, the time which has elapsed since the intermediate pressure is decreased to a substantially constant value after the downstream side discharge valve 18B is opened is used as a representative value of the fuel gas discharge amount. It is considered that a pattern of change in the upstream portion pressure when the fuel gas is discharged is substantially constant (in FIG. 9, a speed of change is substantially constant). Therefore, obtaining the pattern of change in advance by an experiment or the like makes it possible to easily obtain the integral value, if the time which has elapsed since the decrease in the upstream portion pressure is started can be obtained. The time at which the upstream portion pressure starts to decrease matches the time at which the intermediate pressure is decreased to the substantially constant value (time t23).

Therefore, measuring the time which has elapsed since the intermediate pressure is decreased to the substantially constant value (time t23) makes it possible to estimate the integral value and to estimate the fuel gas discharge amount. According to such an estimation method, it is possible to estimate the fuel gas discharge amount with the same accuracy as that in the first embodiment without performing integration. Also, it is possible to determine whether the water accumulated in the gas/liquid separation device 12 is reliably discharged by checking whether the intermediate pressure is decreased to the substantially constant pressure.

The final fuel gas discharge amount can be estimated based on the elapsed time from when the intermediate pressure is decreased to the substantially constant value (time t23) until when the downstream side discharge valve 18B is closed (time t24). When the intermediate pressure is decreased to the predetermined value (time t23), the ECU 20 measures the time which has elapsed since the time t23. When the elapsed time reaches a predetermined reference value, the ECU 20 closes the downstream side discharge valve 18B. The reference value is decided based on the desired fuel gas discharge amount. The final fuel gas discharge amount is the amount of fuel gas which is discharged until the downstream side discharge valve 18B is closed, and closing time of the downstream side discharge valve 18B is decided based on the desired fuel gas discharge amount. Accordingly, it is possible to reliably discharge the fuel gas by the desired amount.

The closing time of the upstream side discharge valve 18A is simultaneous with or after the closing time of the downstream side discharge valve 18B. In this case, the downstream side discharge valve 18B is closed before the upstream side discharge valve 18A is closed. However, the upstream side discharge valve 18A may be closed before the downstream side discharge valve 18B is closed, or the upstream side discharge valve 18A and the downstream side discharge valve 18B may be closed simultaneously. In any of these cases, the final fuel gas discharge amount is decided based on the closing time of the valve which is closed earlier.

A method of determining whether a failure has occurred in the discharge valve will be described. In the fuel cell system, since two discharge valves 18A and 18B are provided, even if gas leakage from one of the discharge valves 18A and 18B occurs due to a failure in closing of the valve, outflow of hydrogen is prevented. However, if the failure is left as it is, a problem occurs in the operation of the system. Therefore, occurrence of gas leakage needs to be detected promptly. In the fuel cell system, the ECU 20 is endowed with gas leakage detection function of detecting gas leakage from the discharge valves 18A and 18B. Hereafter, a method of detecting gas leakage from the discharge valves 18A and 18B performed by the ECU 20 will be described.

The ECU 20 operates the two discharge valves 18A and 18B at different times, and detects gas leakage based on the intermediate pressure between the discharge valves 18A and 18B detected by the pressure sensor 24. FIG. 10 is a timing chart showing a relationship among the operations of the discharge valves 18A and 18B, a change in the intermediate pressure and a change in the fuel gas discharge amount. As shown in FIG. 10, the ECU 20 initially opens the upstream side discharge valve 18A (time t31), and then opens the downstream side discharge valve 18B (time t32). When the upstream side discharge valve 18A is opened, the intermediate pressure temporarily increases. When the downstream side discharge valve 18B is opened, the accumulated water is discharged. Then, discharge of the fuel gas is started, and the intermediate pressure gradually decreases. FIG. 10 shows the case where water is not accumulated in the gas/liquid separation device 12, and the fuel gas starts to be discharged immediately after the downstream side discharge valve 18B is opened.

When a predetermined time has elapsed since the downstream side discharge valve 18B is opened, the ECU 20 closes the downstream side discharge valve 18B (time t33). When a predetermined time has further elapsed since time t33, the ECU 20 closes the upstream side discharge valve 18A (time t34). The predetermined time from when the downstream side discharge valve 18B is opened until when it is closed needs to be sufficiently long enough for the water accumulated in the gas/liquid separation device 12 to be completely discharged if water is accumulated in the gas/liquid separation device 12. The predetermined time from when the downstream side discharge valve 18B is closed until when the upstream side discharge valve 18A is closed needs to be sufficiently long enough for the intermediate pressure to increase to the pressure at a portion upstream of the upstream side discharge valve 18A (hereinafter, referred to as "upstream side pressure") or a pressure near the upstream side pressure.

After the upstream side discharge valve 18A is closed, the ECU 20 determines whether gas leakage from the downstream side discharge valve 18B has occurred. Whether gas leakage from the downstream side discharge valve 18B has occurred can be determined based on a difference between the intermediate pressure at the predetermined time (time t35) after the upstream side discharge valve 18A is closed and the intermediate pressure when the predetermined time has elapsed since time t35 (time t36). In FIG. 10, the determination is started some time after the upstream side discharge valve 18A is closed. However, the determination may be started immediately after the upstream side discharge valve 18A is closed. In FIG. 10, the solid line shows a change in the intermediate pressure in a normal state where gas leakage has not occurred, and the dashed line shows a change in the intermediate pressure when gas leakage has occurred. When gas leakage from the downstream side discharge valve 18B has occurred, high pressure fuel gas flows from a portion between the discharge valves 18A and 18B to the downstream side of the downstream side discharge valve 18B. Therefore, the intermediate pressure gradually decreases. The ECU 20 compares the intermediate pressure at time t35 and the intermediate pressure at time t36 after the upstream side discharge valve 18A is closed. If the pressure difference (decrease value) is equal to or larger than a predetermined value, the ECU 20 determines that gas leakage from the downstream side discharge valve 18B has occurred.

Next, the ECU 20 opens the downstream side discharge valve 18B while keeping the upstream side discharge valve 18A closed (time t41). When a predetermined time has elapsed since time t41, the ECU 20 closes the downstream side discharge valve 18B again (time t42). The predetermined time from when the downstream side discharge valve 18B is opened until it is closed needs to be sufficiently long enough for the intermediate pressure to decrease to the pressure at a portion downstream of the downstream side discharge valve 18B (hereinafter, referred to as "downstream side pressure") or a pressure near the downstream side pressure.

After the downstream side discharge valve 18B is closed, the ECU 20 determines whether gas leakage from the upstream side discharge valve 18A has occurred. Whether gas leakage from the upstream side discharge valve 18A can be determined based on the difference between the intermediate pressure at a predetermined time (time t43) after the downstream side discharge valve 18B is closed and the intermediate pressure when a predetermined time has elapsed since time t43 (time t44). In FIG. 10, the determination is started some time after the downstream side discharge valve 18B is closed. However, the determination may be started immediately after the downstream side discharge valve 18B is closed.

Figure 10:
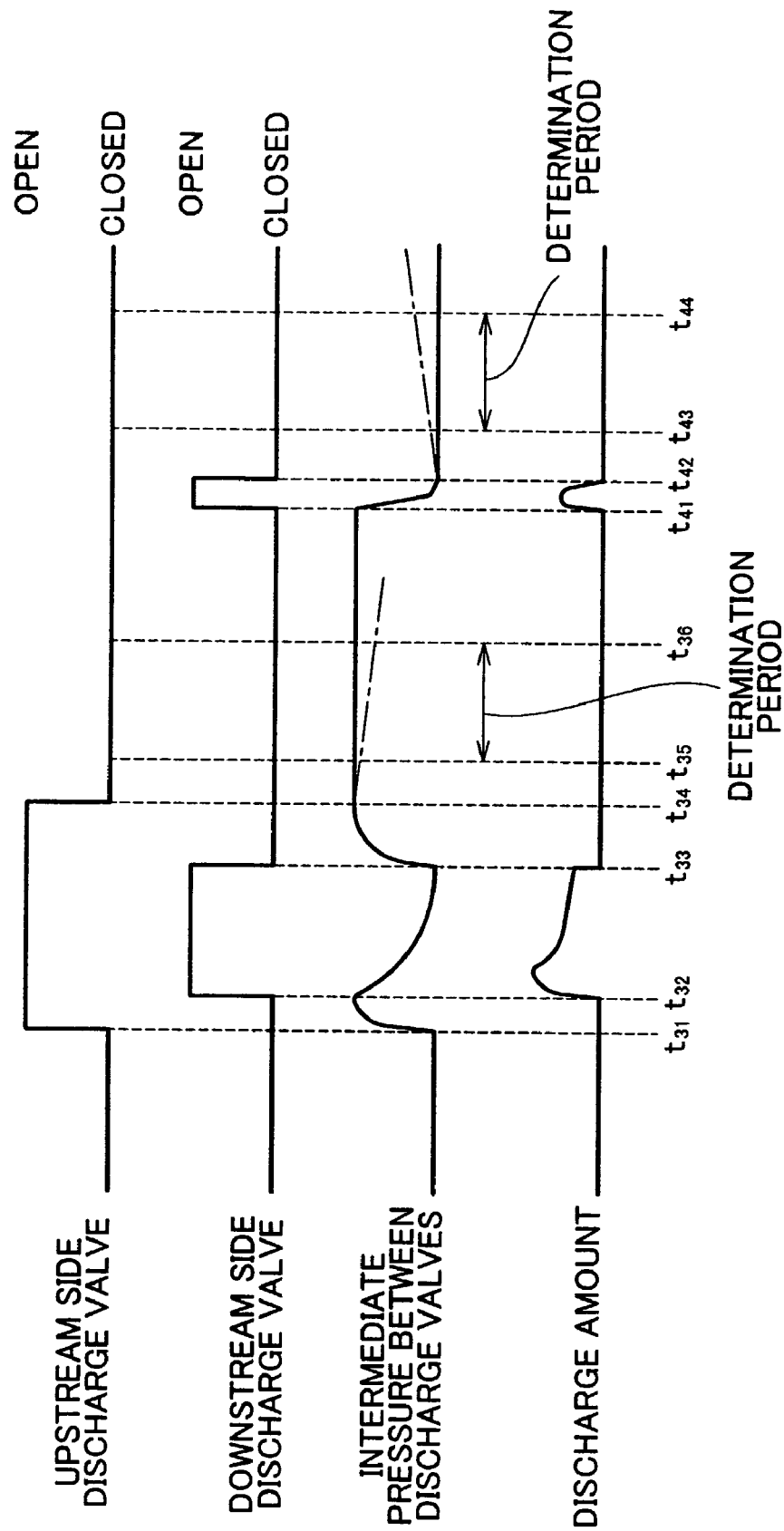
FIG. 10 is a timing chart for describing a method of determining whether a failure has occurred in closing of the discharge valve according to the fourth embodiment of the invention.

In FIG. 10, the solid line shows a change in the intermediate pressure in the normal state where gas leakage has not occurred, and the dashed line shows a change in the intermediate pressure when gas leakage has occurred. When gas leakage from the upstream side discharge valve 18A has occurred, high pressure fuel gas flows from the upstream side of the upstream side discharge valve 18A to a portion between the discharge valves 18A and 18B. Therefore, the intermediate pressure gradually increases. The ECU 20 compares the intermediate pressure at time t43 with the intermediate pressure at time t44 after the downstream side discharge valve 18B is closed. When the pressure difference (increase value) is equal to or larger than a predetermined value, the ECU 20 determines that gas leakage from the upstream side discharge valve 18A has occurred.

When gas leakage from the valve connected to the circulation system of the fuel cell system 2 is detected, conventionally, a shut-off valve needs to be provided at each of an inlet and an outlet of the fuel cell 2 such that the fuel cell 2 is separated from the circulation system. Whether gas leakage has occurred can be determined based on a decrease in the pressure in the closed region. However, the electrolyte membrane of the fuel cell 2 is gas-permeable membrane. Accordingly, if the fuel cell 2 is connected to the circulation system, the closed region cannot be formed, and therefore an accurate determination cannot be made. However, with the fuel cell system according to the invention, a closed region is formed between the two discharge valves 18A and 18B, and whether gas leakage from the discharge valves 18A and 18B has occurred can be determined based on a change in the pressure in the closed region. Accordingly, it is not necessary to provide a shut-off valve in each of the inlet and the outlet of the fuel cell 2. Further, it is not necessary to stop a supply of the fuel gas to the fuel cell 2. It is therefore possible to determine whether gas leakage has occurred even during the operation of the fuel cell system.

Hereafter, a fifth embodiment of the invention will be described with reference to FIG. 11.

Figure 11:
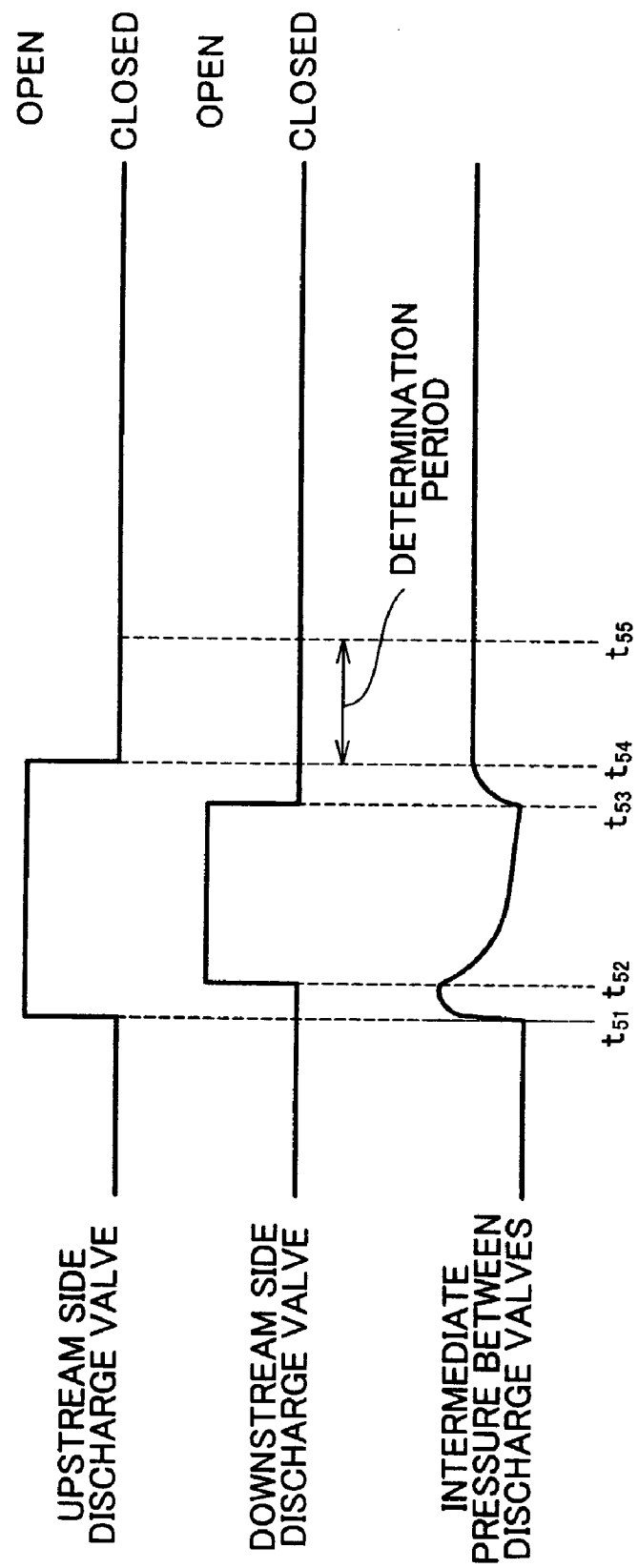
FIG. 11 is a timing chart for describing a method of determining whether a failure has occurred in closing of the discharge valve according to a fifth embodiment of the invention.

The fuel cell system according to the fifth embodiment is the same as the fuel cell system according to the fourth embodiment except that a method of determining whether a failure has occurred in closing of a valve shown in FIG. 11 is performed instead of the method of determining whether a failure has occurred in closing of the valve shown in FIG. 10. The fuel cell system according to the fifth embodiment is different from the fuel cell system according to the fourth embodiment only in the method of determining whether a failure has occurred in closing of the discharge valves 18A and 18B.

The method of determining whether a failure has occurred in the discharge valves 18A and 18B will be described. FIG. 11 is a timing chart showing a relationship between the operations of the discharge valves 18A and 18B and a change in the intermediate pressure. As shown in FIG. 11, the ECU 20 initially opens the upstream side discharge valve 18A (time t51), and then opens the downstream side discharge valve 18B (time t52). When the upstream side discharge valve 18A is opened, the intermediate pressure temporarily increases. When the downstream side discharge valve 18B is opened, the accumulated water is discharged, and then discharge of the fuel gas is started. As a result, the intermediate pressure gradually decreases. FIG. 11 shows the case where water is not accumulated in the gas/liquid separation device 12 and fuel gas starts to be discharged immediately after the downstream side discharge valve 18B is opened.

When a predetermined time has elapsed since the downstream side discharge valve 18B is opened, the ECU 20 closes the downstream side discharge valve 18B (time t53). When a predetermined time has further elapsed since time t53, the ECU 20 closes the upstream side discharge valve 18A (time t54). The predetermined time from when the downstream side discharge valve 18B is opened until when it is closed needs to be sufficiently long enough for the water accumulated in the gas/liquid separation device 12 to be completely discharged if water is accumulated in the gas/liquid separation device 12. The fuel cell system according to the fifth embodiment is characterized in a method of setting of the predetermined time from when the downstream side discharge valve 18B is closed until when the upstream side discharge valve 18A is closed. In the fifth embodiment, the predetermined time is set such that the intermediate pressure becomes a pressure between the upstream side pressure (the pressure at a portion upstream of the upstream side discharge valve 18A) and the downstream side pressure (the pressure at a portion downstream of the downstream side discharge valve 18B).

In the fifth embodiment, after the upstream side discharge valve 18A is closed, a determination as to whether gas leakage from the downstream side discharge valve 18B has occurred (hereinafter, referred to as a "gas leakage determination for the downstream side discharge valve 18B") and a determination as to whether gas leakage from the upstream side discharge valve 18A has occurred (hereinafter, referred to as a "gas leakage determination for the upstream side discharge valve 18A") are performed simultaneously. More particularly, the ECU 20 determines whether gas leakage has occurred based on the difference between the intermediate pressure when the upstream side discharge valve 18A is closed (time t54) and the intermediate pressure when a predetermined time has elapsed since time t54 (time t55). When gas from the downstream side discharge valve 18B has occurred, the fuel gas flows from the portion between the discharge valves 18A and 18B to the downstream side of the downstream side discharge valve 18B. As a result, the intermediate pressure gradually decreases. Meanwhile, when gas leakage from the upstream side discharge valve 18A has occurred, high pressure fuel gas flows from the upstream side of the upstream side discharge valve 18A to a portion between the discharge valves 18A and 18B. As a result, the intermediate pressure gradually increases.

The ECU 20 compares the intermediate pressure at time t54 with the intermediate pressure at time t55. In the case where the intermediate pressure decreases, if the decrease value is equal to or larger than a predetermined value, the ECU 20 determines that gas leakage from the downstream side discharge valve 18B has occurred. On the other hand, in the case where the intermediate pressure increases, if the increase value is equal to or larger than a predetermined value, the ECU 20 determines that gas leakage from the upstream side discharge valve 18A has occurred. According to the method in the fifth embodiment, it is possible to perform the gas leakage determination for the discharge valve 18A and the gas leakage determination for the discharge valve 18B simultaneously. Therefore, the determination can be performed efficiently, as compared to the method according to the fourth embodiment.

Hereafter, a sixth embodiment of the invention will be described with reference to FIG. 12.

Figure 12:
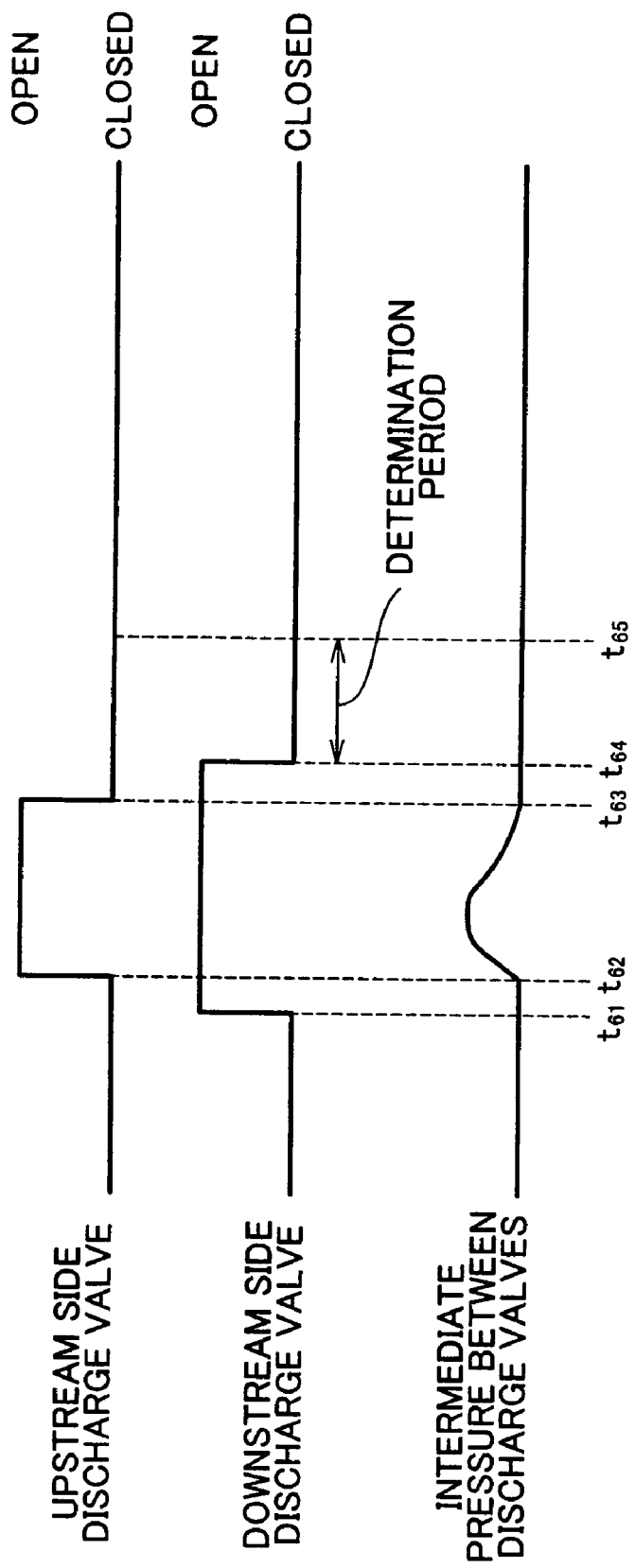
FIG. 12 is a timing chart for describing a method of determining whether a failure has occurred in closing of the discharge valve according to a sixth embodiment of the invention.

The fuel cell system according to the sixth embodiment is the same as the fuel cell system according to the fourth embodiment except that the method of determining whether a failure has occurred in closing of a valve shown in FIG. 12 is performed instead of the method of determining whether a failure has occurred in closing of the valve shown in FIG. 10. The fuel cell system according to the sixth embodiment is different from the fuel cell system according to the fourth embodiment only in the method of determining whether a failure has occurred in closing of the discharge valves 18A and 18B.

The method of determining whether a failure has occurred in the discharge valves 18A and 18B will be described. In each of the fourth and fifth embodiments, the gas leakage determination for the discharge valve 18A and the gas leakage determination for the discharge valve 18B are performed successively or simultaneously. However, in the sixth embodiment, only the gas leakage determination for the upstream side discharge valve 18A is constantly performed during the operation of the system, and the gas leakage determination for the downstream side discharge valve 18B is performed only when the system is activated/stopped. The method of determining whether gas leakage from the downstream side discharge valve 18B has occurred is the same as that in the fourth embodiment. Therefore, the description will not be made here.

FIG. 12 is a timing chart showing a relationship between the operations of the discharge valves 18A and 18B and a change in the intermediate pressure. As shown in FIG. 12, the ECU 20 initially opens the downstream side discharge valve 18B (time t61), and then opens the upstream side discharge valve 18A (time t62). The intermediate pressure temporarily increases when the upstream side discharge valve 18A is opened, and then gradually decreases.

When a predetermined time has elapsed since the upstream side discharge valve 18A is opened, the ECU 20 closes the upstream side discharge valve 18A (time t63). When a predetermined time has further elapsed since time t63, the ECU 20 closes the downstream side discharge valve 18B (time t64). The predetermined time from when the upstream side discharge valve 18A is opened until when it is closed needs to be sufficiently long enough for the water accumulated in the gas/liquid separation device 12 to be completely discharged if water is accumulated in the gas/liquid separation device 12. Also, the predetermined time from when the upstream side discharge valve 18A is closed until when the downstream side discharge valve 18B is closed needs to be sufficiently long enough for the intermediate pressure to decrease to the downstream side pressure (the pressure at a portion downstream of the downstream side discharge valve 18B) or a value near the downstream side pressure.

After the downstream side discharge valve 18B is closed, the ECU 20 performs the gas leakage determination for the upstream side discharge valve 18A. The ECU 20 performs the gas leakage determination based on a difference between the intermediate pressure when the downstream side discharge valve 18B is closed (time t64) and the intermediate pressure when a predetermined time has elapsed since time t64 (time t65). When it is determined that gas leakage from the upstream side discharge valve 18A has occurred, high pressure fuel gas flows from the upstream side of the upstream side discharge valve 18A to a portion between the discharge valves 18A and 18B. As a result, the intermediate pressure gradually increases. The ECU 20 compares the intermediate pressure at time t64 with the intermediate pressure at time t65. When the pressure difference (increase value) is equal to or larger than a predetermined value, the ECU 20 determines that gas leakage from the upstream side discharge valve 18A has occurred.

Hereafter, a seventh embodiment of the invention will be described with reference to FIGS. 13 and 14.

Figure 13:
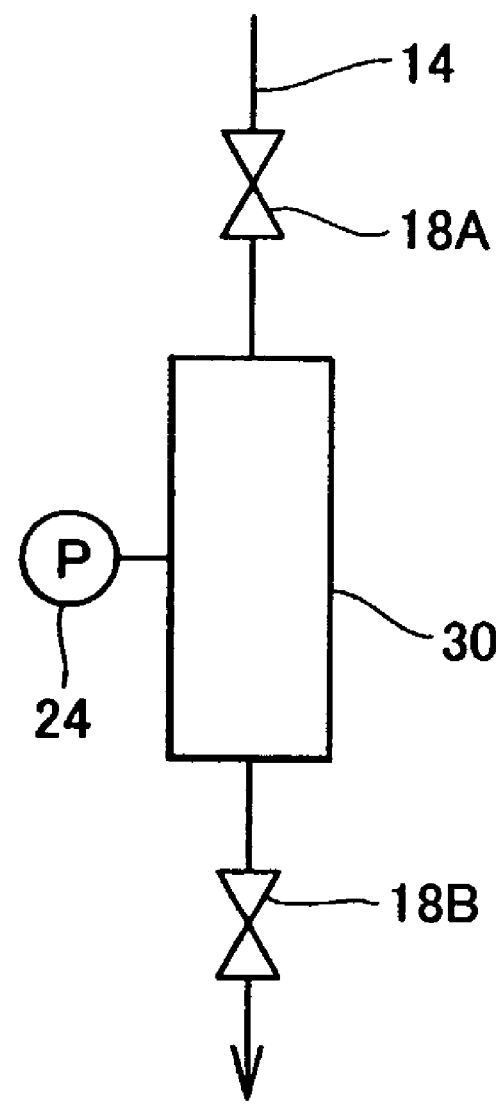
FIG. 13 is a diagram schematically showing a structure of a fuel cell system according to a seventh embodiment of the invention.

FIG. 13 is a diagram showing a main portion of the fuel cell system according to the seventh embodiment of the invention. The fuel cell system according to the seventh embodiment is the same as the fuel cell system according to the fourth embodiment except that a structure shown in FIG. 13 is employed as the structure of the discharge system connected to the gas/liquid separation device 12 and the ECU 20 performs the method of determining whether a failure has occurred in closing of a valve shown in FIG. 14 instead of the method shown in FIG. 10.

The structure of the fuel cell system will be described. The structure of the fuel cell system according to the seventh embodiment is the same as that of the fuel cell system according the fourth embodiment except that a buffer tank 30 is provided between the upstream side discharge valve 18A and the downstream side discharge valve 18B. The pressure sensor 24 is provided so as to detect pressure in the buffer tank 30. The structure of fuel cell system according to the seventh embodiment is the same as that of the fuel cell system according to the fourth embodiment except for the portion shown in FIG. 13. Therefore, the description will not be made here.

The method of determining whether a failure has occurred in the discharge valves 18A and 18B will be described. FIG. 14 is a timing chart showing a relationship between the operations of the discharge valves 18A and 18B and a change in the intermediate pressure. Since the buffer tank 30 is provided between the discharge valves 18A and 18B, the change in the intermediate pressure due to the operations of the discharge valves 18A and 18B is moderate, as compared to the fourth embodiment. Therefore, when the upstream side discharge valve 18A is opened while the downstream side discharge valve 18B is kept closed, the intermediate pressure increases due to inflow of the high pressure fuel gas from the upstream side. However, the increase value can be adjusted by the valve opened time of the upstream side discharge valve 18A. The ECU 20 opens the upstream side discharge valve 18A (time t71) while keeping the downstream side discharge valve 18B closed. When a predetermined time has elapsed since time t71 (time t72), the ECU 20 closes the upstream side discharge valve 18A. The predetermined time is set such that the intermediate pressure becomes a pressure between the upstream side pressure (pressure at a portion upstream of the upstream side discharge valve 18A) and the downstream side pressure (pressure at a portion downstream of the downstream side discharge valve 18B). Adjusting the intermediate pressure to a value between the upstream side pressure and the downstream side pressure makes it possible to perform the gas leakage determination for the downstream side discharge valve 18B and the gas leakage determination for the upstream side discharge valve 18A simultaneously, as in the fifth embodiment.

After the time of the gas leakage determination for both the discharge valves 18A and 18B has elapsed (time t73), the ECU 20 opens the upstream side discharge valve 18A while keeping the downstream side discharge valve 18B closed. When a predetermined time has elapsed since time t73 (time t74), the ECU 20 closes the upstream side discharge valve 18A. This predetermined time needs to be sufficiently long enough for the intermediate pressure to increase to the upstream side pressure (the pressure at a portion upstream of the upstream side discharge valve 18A) or a pressure near the upstream side pressure. Adjusting the intermediate pressure to a pressure near the upstream side pressure make it possible to perform the gas leakage determination for the downstream side discharge valve 18B in the same manner as the fourth embodiment.

After the time of the gas leakage determination for the downstream side discharge valve 18B has elapsed (time t75), the ECU 20 opens the downstream side discharge valve 18B while keeping the upstream side discharge valve 18A closed.

When a predetermined time has elapsed since time t75 (time t76), the ECU 20 closes the downstream side discharge valve 18B. This predetermined time is set to a value sufficiently long enough for the intermediate pressure to decrease to the downstream side pressure (the pressure at a portion downstream of the downstream side discharge valve 18B) or a pressure near the downstream side pressure. Adjusting the intermediate pressure to a pressure near the downstream side pressure makes it possible to perform the gas leakage determination for the upstream side discharge valve 18A in the same manner as the fourth embodiment.

With the fuel cell system according to the seventh embodiment, since the buffer tank 30 is provided between the discharge valves 18A and 18B, the intermediate pressure can be easily adjusted to a desired value. As a result, it is possible to perform gas leakage determination at various pressure levels, as described above.

Hereafter, an eighth embodiment of the invention will be described with reference to FIG. 15.

The fuel cell system according to the eighth embodiment is the same as the fuel cell system according to the fourth embodiment except that a relief valve which opens at relatively low pressure (for example, valve opening pressure of approximately 10 kPa) is used as the downstream side discharge valve 18B, and the ECU 20 performs the method of determining whether a failure has occurred in closing of a valve shown in FIG. 15 instead of the method shown in FIG. 10.

The method of determining whether a failure has occurred in the discharge valves 18A and 18B will be described. FIG. 15 is a timing chart showing a relationship between the operations of the discharge valves 18A and 18B, and a change in the intermediate pressure. Note that the operation of only the upstream side discharge valve 18A can be controlled directly in the eighth embodiment. As shown in FIG. 15, when the ECU 20 opens the upstream side discharge valve 18A (time t81), the intermediate pressure increases as the upstream side discharge valve 18A is opened. When the intermediate pressure reaches the valve opening pressure for the down stream side discharge valve 18B, the downstream side discharge valve 18B is opened (time t82). Even after the downstream side discharge valve 18B is opened, the intermediate pressure keeps increasing due to the difference in the flow amount between the discharge valves 18A and 18B. When a predetermined time has elapsed since time t82 (time t83), the upstream side discharge valve 18A is closed, and therefore the intermediate pressure gradually decreases. When the intermediate pressure becomes lower than the valve opening pressure for the downstream side discharge valve 18B (time t84), the downstream side discharge valve 18B is also closed.

After the downstream side discharge valve 18B is closed, if gas leakage from the downstream side discharge valve 18B has occurred, the fuel gas flows from a portion between the discharge valves 18A and 18B to the downstream side of the downstream side discharge valve 18B. As a result, the intermediate pressure gradually decreases from the valve opening pressure for the downstream side discharge valve 18B. On the other hand, when gas leakage from the upstream side discharge valve 18A has occurred, the high pressure fuel gas flows from the upstream side of the upstream side discharge valve 18A to a portion between the discharge valves 18A and 18B. As a result, the intermediate pressure gradually increases. In this case, the downstream side discharge valve 18B is opened again when the intermediate pressure increases to a predetermined valve opening pressure.

The ECU 20 compares the intermediate pressure when the downstream side discharge valve 18B is closed (time t84) with the intermediate pressure when a predetermined time has elapsed since time t84 (time t85). In the case where the intermediate pressure decreases, when the decrease value is equal to or larger than a predetermined value, the ECU 20 determines that gas leakage from the downstream side discharge valve 18B has occurred. On the other hand, in the case where the intermediate pressure increases, when the increase value is equal to or larger than a predetermined value, the ECU 20 determines that gas leakage from the upstream side discharge valve 18A has occurred. According to the method in the eighth embodiment, as in the fourth embodiment, it is possible to perform the gas leakage determination for the discharge valve 18A and the gas leakage determination for the discharge valve 18B simultaneously. Further, it is not necessary to perform the control of the downstream side discharge valve 18B.

While the invention has been described in detail with reference to the preferred embodiments, the invention is not limited to the above-mentioned embodiments, and the invention may be realized in various other embodiments within the scope of the invention. For example, the invention may be realized in the following modified embodiments.

The method of estimating the amount of accumulated water according to the second embodiment and the third embodiment can be employed for the control of the amount of water accumulated in the gas/liquid separation device 12. For example, when a predetermined amount water needs to be left in the gas/liquid separation device 12, for example, when the fuel cell system is stopped, the amount of accumulated water is estimated according to the above-mentioned method, and the valve opened time of the discharge valve 16 is set based on the difference between the estimated amount of accumulated water and the predetermined amount of water. It is therefore possible to reliably adjust the amount of accumulated water to a desired value without using a water level sensor.

Also, in the fourth to eighth embodiments, the method of determining whether a failure (gas leakage) has occurred in the discharge valves 18A and 18B is described. With the fuel cell system shown in FIG. 8, it is also possible to determine whether a failure (clogging or the like) has occurred in opening of the discharge valves 18A and 18B based on the intermediate pressure between the discharge valves 18A and 18B. When the upstream side valve 18A is closed before the downstream side valve 18B is closed, if both the discharge valves 18A and 18B are operating properly, the intermediate pressure decreases as the upstream side valve 18A is closed. However, when a failure has occurred in opening of the downstream side valve 18B, the amount of decrease in the intermediate pressure becomes smaller than that at normal time. Therefore, it is possible to determine whether a failure has occurred in opening of the downstream side valve 18B by comparing the amount of decrease in the intermediate pressure with a predetermined value.

On the other hand, when the downstream side valve 18B is closed before the upstream side valve 18A is closed, if both the discharge valves 18A and 18B are operating properly, the intermediate pressure increases as the downstream side valve 18B is closed. However, when a failure has occurred in opening of the upstream side valve 18A, the amount of increase in the intermediate pressure becomes smaller than that at the normal time. Therefore, it is possible to determine whether a failure has occurred in opening of the upstream side valve 18A by comparing the amount of increase in the intermediate pressure with a predetermined value.

In the above-mentioned embodiments, the invention is applied to the fuel cell system which is operated while the fuel gas is circulated. However, the invention can be applied to a fuel cell system of so-called anode dead end type. In the fuel cell system of anode dead end type, usually, the fuel cell is operated with the discharge valve closed, and there is almost no flow of fuel gas near the anode outlet. Therefore, nitrogen which has permeated through the electrolyte membrane from the cathode side and the water generated due to an electrochemical reaction are accumulated at the anode outlet, and finally accumulated in the fuel off-gas passage.

Accordingly, in the fuel cell system of anode dead end type as well, it is necessary to discharge the water and nitrogen accumulated at the anode of the fuel cell to the outside the fuel cell system by periodically opening the discharge valve. At this time, estimating the amount of discharged fuel gas or the amount of accumulated water according to the method described in the above-mentioned embodiments and controlling the operation of the discharge valve based on the result of estimation makes it possible to reliably discharge desired amounts of fuel gas and accumulated water.

What is claimed is:

1. A fuel cell system, comprising:
    a fuel cell which generates electric power by being supplied with fuel gas and oxygen;
    an off-gas passage through which fuel gas discharged from the fuel cell passes;
    a gas/liquid separation device which is provided in the off-gas passage and which separates water from the fuel gas and accumulates the water;
    a discharge valve which is connected to the gas/liquid separation device and which can discharge the fuel gas to an outside of the fuel cell system along with the water accumulated in the gas/liquid separation device; and
    a controller that controls an opening/closing operation of the discharge valve, wherein
    the controller detects or estimates a change in pressure at a portion upstream of the discharge valve, decides a closing time at which an integral value that obtained by integrating an amount of change in the pressure at the portion upstream of the discharge valve with respect to time from when the discharge valve is opened or a parameter value corresponding to the integral value reaches a predetermined value, and closes the discharge valve at the closing time.

2. The fuel cell system according to claim 1, further comprising:
    upstream portion pressure detector for detecting the pressure at the portion upstream of the discharge valve before the discharge valve is opened; and
    correcting device for correcting the closing time at which the discharge valve is closed based on the detected pressure at the portion upstream of the discharge valve.

3. The fuel cell system according to claim 2, further comprising:
    downstream portion pressure detector for detecting pressure at a portion downstream of the discharge valve before the discharge valve is opened, wherein
    the correcting device corrects the closing time at which the discharge valve is closed based on the detected pressure at the portion upstream of the discharge valve and the detected pressure at the portion downstream of the discharge valve.

4. The fuel cell system according to claim 1, wherein
    the discharge valve includes an upstream side discharge valve and a downstream side discharge valve which are provided in series,
    the controller estimates the change in the pressure at the portion upstream of the discharge valve based on a change in pressure in a passage between the upstream side discharge valve and the downstream side discharge valve when the downstream side discharge valve is opened after the upstream side discharge valve is opened, and the controller obtains time, which has elapsed since the pressure in the passage is decreased to a predetermined value after the downstream side discharge valve is opened, as the parameter value corresponding to the integral value.

5. The fuel cell system according to claim 4, further comprising:
    failure determining device for determining whether a failure has occurred in at least one of the upstream side discharge valve and the downstream side discharge valve based on how the pressure in the passage changes when the upstream side discharge valve and the downstream discharge valve are closed at different times.

6. The fuel cell system according to claim 5, wherein
    the failure determining device determines that a failure has occurred in closing of the upstream side discharge valve, when an amount of increase in the pressure in the passage is equal to or larger than a predetermined value in a case where the downstream side discharge valve is closed after the upstream side discharge valve is closed.

7. The fuel cell system according to claim 6, wherein
    whether a failure has occurred in closing of the upstream side discharge valve is determined at least one of a start time and a stop time of the fuel cell.

8. The fuel cell system according to claim 6, wherein
    the failure determining device determines that a failure has occurred in opening of the downstream side discharge valve when an amount of decrease in the pressure in the passage is equal to or smaller than a predetermined value in a case where the upstream side discharge valve is closed before the downstream side discharge valve is closed.

9. The fuel cell system according to claim 6, wherein
    the failure determining device determines that a failure has occurred in opening of the upstream side discharge valve when an amount of increase in the pressure in the passage is equal to or smaller than the predetermined value in a case where the downstream side discharge valve is closed before the upstream side discharge valve is closed.

10. The fuel cell system according to claim 5, wherein
    the failure determining device determines that a failure has occurred in closing of the downstream side discharge valve when an amount of decrease in the pressure in the passage is equal to or larger than a predetermined value in a case where the upstream side discharge valve is closed after the downstream side discharge valve is closed.

11. The fuel cell system according to claim 5, wherein
    the failure determining device makes the pressure in the passage between the upstream side discharge valve and the downstream side discharge valve pressure between pressure on an upstream side of the upstream side discharge valve and pressure on a downstream side of the downstream side discharge valve by controlling the upstream side discharge valve and the downstream side discharge valve, and
    the failure determining device determines whether a failure has occurred in closing of at least one of the upstream side discharge valve and the downstream side discharge valve by measuring the pressure in the passage between the upstream side discharge valve and the downstream side discharge valve with the upstream side discharge valve and the downstream side discharge valve kept closed.

12. The fuel cell system according to claim 4, further comprising:
a tank which is provided between the upstream side discharge valve and the downstream side discharge valve and which has a predetermined volume; and
tank portion pressure detector for detecting pressure in the tank.

13. The fuel cell system according to claim 4, wherein the downstream side discharge valve is a relief valve.

14. A fuel cell system, comprising:
a fuel cell which generates electric power by being supplied with fuel gas and oxygen;
an off-gas passage through which an off-gas of the fuel gas discharged from the fuel cell passes;
a gas/liquid separation device which is provided in the off-gas passage and which separates water from the off-gas and accumulates the water;
a discharge valve which is connected to the gas/liquid separation device and which can discharge the off-gas to an outside of the fuel cell system along with the water accumulated in the gas/liquid separation device; and
a controller controls that an opening/closing operation of the discharge valve, wherein
the controller estimates an amount of water accumulated in the gas/liquid separation device based on an amount of water generated in the fuel cell which is calculated based on an amount of electric power generated by the fuel cell, and decides a closing time at which the discharge valve is closed based on the estimated amount of accumulated water.

15. The fuel cell system according to claim 14, wherein the controller decides an opening time at which the discharge valve is opened based on the estimated amount of accumulated water.

16. A control method for a fuel cell system including a gas/liquid separation device which is provided in an off-gas passage that is a passage through which fuel gas discharged from a fuel cell passes, and which separates water from an off-gas of the fuel gas and accumulates the water; and a discharge valve which is connected to the gas/liquid separation device and which can discharge the off-gas to an outside of the fuel cell system along with the water accumulated in the gas/liquid separation device, comprising the steps of:
obtaining an amount of change in pressure at a portion upstream of the discharge valve, which occurs due to an opening operation of the discharge valve;
deciding a closing time at which an integral value obtained by integrating the amount of change in the pressure with respect to time from when the discharge valve is opened or a parameter value corresponding to the integral value reaches a predetermined value; and
closing the discharge valve at the closing time.

17. A control method for a fuel cell system including a gas/liquid separation device which is provided in an off-gas passage that is a passage through which fuel gas discharged from a fuel cell passes, and which separates water from an off-gas of the fuel gas and accumulates the water; and a discharge valve which is connected to the gas/liquid separation device and which can discharge the off-gas to an outside of the fuel cell system along with the water accumulated in the gas/liquid separation device, comprising the steps of:
estimating an amount of water accumulated in the gas/liquid separation device based on an amount of water generated in the fuel cell, which is calculated based on an amount of electric power generated by the fuel cell; and
deciding a closing time at which the discharge valve is closed based on the estimated
amount of accumulated water.

18. A fuel cell system, comprising:
a fuel cell which generates electric power by being supplied with fuel gas and oxygen;
an off-gas passage through which an off-gas of the fuel gas discharged from the fuel cell passes;
a gas/liquid separation device which is provided in the off-gas passage and which separates water from the off-gas and accumulates the water;
a discharge valve which is connected to the gas/liquid separation device and which can discharge the off-gas to an outside of the fuel cell system along with the water accumulated in the gas/liquid separation device; and
control means for controlling an opening/closing operation of the discharge valve, wherein
the control means detects or estimates a change in pressure at a portion upstream of the discharge valve, decides a closing time at which an integral value that is obtained by integrating an amount of change in the pressure at the portion upstream of the discharge valve with respect to time from when the discharge valve is opened or a parameter value corresponding to the integral value reaches a predetermined value, and closes the discharge value at the closing time.

19. A fuel cell system, comprising:
a fuel cell which generates electric power by being supplied with fuel gas and oxygen;
an off-gas passage through which an off-gas of the fuel gas discharged from the fuel cell passes;
a gas/liquid separation device which is provided in the off-gas passage and which separates water from the off-gas and accumulates the water;
a discharge valve which is connected to the gas/liquid separation device and which can discharge the off-gas to an outside of the fuel cell system along with the water accumulated in the gas/liquid separation device; and
control means for controlling an opening/closing operation of the discharge valve, wherein
the control means estimates an amount of water accumulated in the gas/liquid separation device based on an amount of water generated in the fuel cell which is calculated based on an amount of electric power generated by the fuel cell, and decides a closing time at which the discharge valve is closed based on the estimated amount of accumulated water.

* * * * *